(12) United States Patent
Minase

(10) Patent No.: US 6,603,723 B2
(45) Date of Patent: Aug. 5, 2003

(54) RECORDING MEDIUM LOADING DEVICE

(75) Inventor: Minoru Minase, Iruma (JP)

(73) Assignee: Teac Corporation, Tokyo (JP)

( * ) Notice: Subject to any disclaimer, the term of this patent is extended or adjusted under 35 U.S.C. 154(b) by 154 days.

(21) Appl. No.: 09/911,117

(22) Filed: Jul. 23, 2001

(65) Prior Publication Data

US 2002/0018426 A1 Feb. 14, 2002

(30) Foreign Application Priority Data

Jul. 28, 2000 (JP) ........................................ 2000-229855
Jul. 28, 2000 (JP) ........................................ 2000-229856
Jun. 7, 2001 (JP) ........................................ 2001-172912

(51) Int. Cl.[7] ............................................. G11B 33/02
(52) U.S. Cl. ..................................... 369/75.2; 369/77.1
(58) Field of Search ................... 369/75.2, 30.99, 369/77.1; 360/90.02, 90.03, 90.06, 90.07

(56) References Cited

U.S. PATENT DOCUMENTS

| | | | | |
|---|---|---|---|---|
| 4,653,039 A | * | 3/1987 | Ueno et al. ................ | 369/75.2 |
| 5,621,713 A | * | 4/1997 | Sato et al. ................ | 369/75.2 |
| 5,933,295 A | * | 8/1999 | Uwabo et al. ............ | 360/266.2 |
| 5,943,309 A | * | 8/1999 | Watanabe ................. | 369/75.1 |
| 6,181,510 B1 | * | 1/2001 | Fujiura .................... | 360/99.06 |
| 6,208,606 B1 | * | 3/2001 | Saito ........................ | 369/77.1 |
| 6,266,311 B1 | * | 7/2001 | Song et al. ............... | 369/77.1 |

FOREIGN PATENT DOCUMENTS

JP          1186402          3/1999

* cited by examiner

Primary Examiner—David L. Ometz
Assistant Examiner—Mark S. Blouin
(74) Attorney, Agent, or Firm—Ladas & Parry

(57) ABSTRACT

A recording medium loading device includes a chassis, a movable unit for holding a recording medium, and a lock unit including a lock member and an operation member. The movable unit is movable between a housed position in which the movable unit is housed in the chassis and an ejected position to which the movable unit is ejected from the chassis. The lock member is movable between a locking position to lock the movable unit in the housed position and an unlocking position to unlock the movable unit. The operation member includes an operation part and an engaging part engaging the lock member. The operation part is manually operated to move the operation member so that the operation member moves the lock member from the locking position to the unlocking position by applying force to the lock member through the engaging part.

6 Claims, 23 Drawing Sheets

FIG. 3B
FIG. 3A
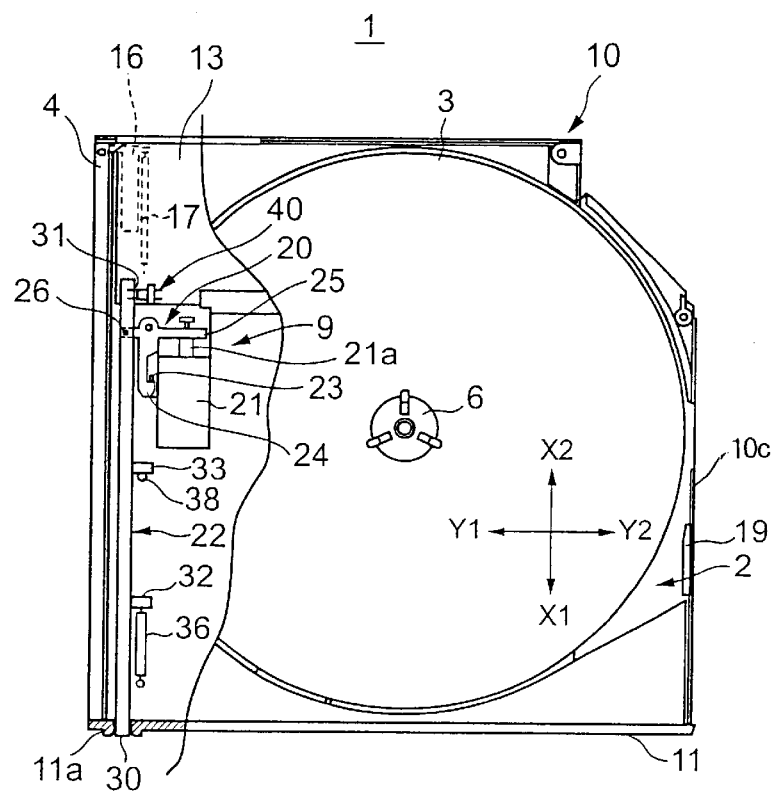
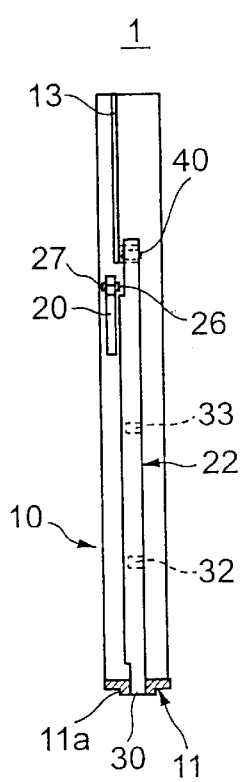
FIG. 3C
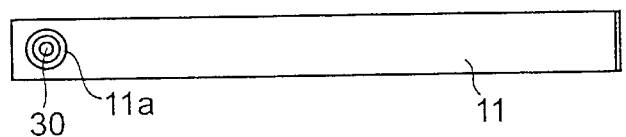

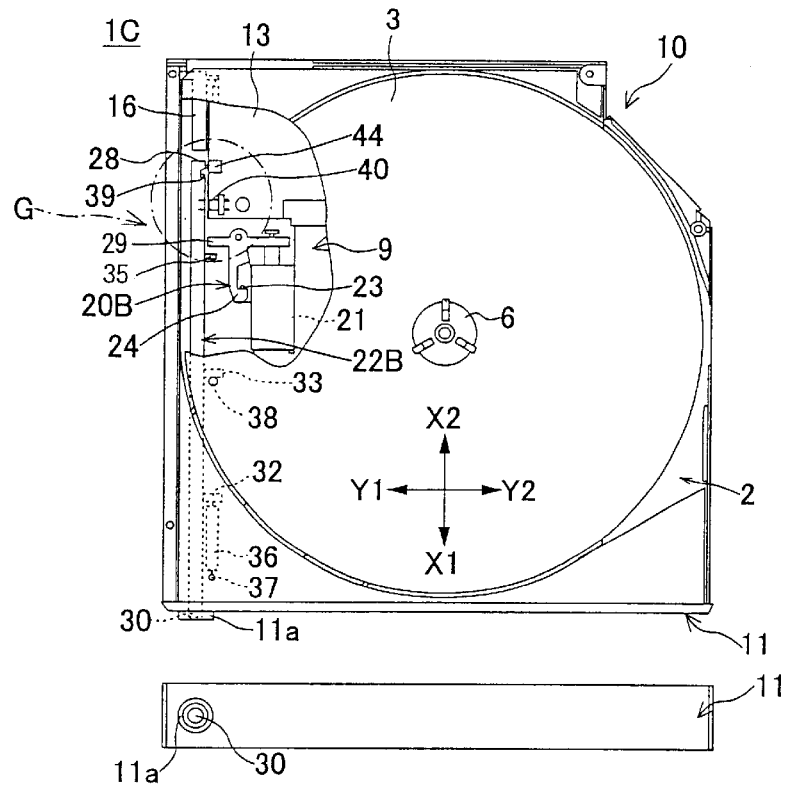
FIG. 18A
FIG. 18B
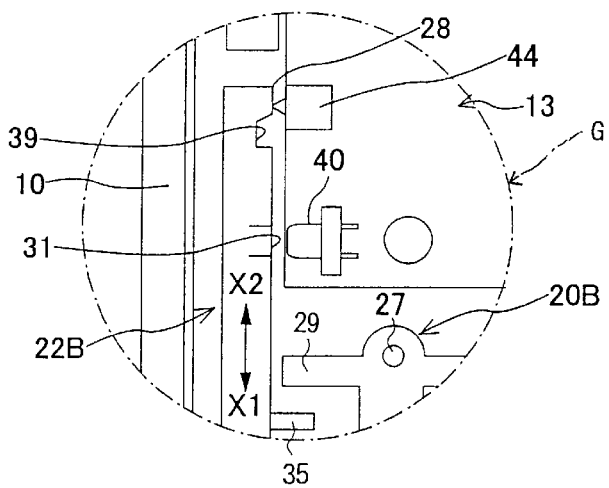
FIG. 18C

RECORDING MEDIUM LOADING DEVICE

BACKGROUND OF THE INVENTION

1. Field of the Invention

The present invention generally relates to recording medium loading devices, and more particularly a recording medium loading device for conveying a recording medium, or a disk, between a loaded position and an ejected position.

2. Description of the Related Art

A 12 or 18 cm compact disk from which recorded data is reproduced by means of a laser pickup, for instance, has been employed as a storage medium for storing information such as a database or software. Therefore, a disk unit to be housed in a chassis, or a housing, (a built-in-type CD-ROM drive) has been developed so as to be incorporated into a downsized notebook computer. Further, the disk unit includes a recording medium loading device for conveying the disk between a loaded position in which the disk has data reproduced therefrom and an ejected position in which the disk is placed on or removed from the recording medium loading device.

A recording medium loading device included in a conventional disk unit has its tray on which a disk is placed driven by a motor. When the tray moves outside a chassis, a disk is placed on a turntable in the tray. Then, the tray is moved back again into the chassis by the driving force of the motor.

However, such a tray-driving method as described above requires a motor for driving the tray and a transmission mechanism for transmitting a driving force to the tray. This makes it difficult to produce a smaller and thinner disk unit, thus preventing the disk unit from being incorporated into the housing of a notebook computer.

Further, the above-described recording medium loading device has the entire disk positioned in a disk placement portion formed in the tray. The disk placement portion is a circular concave portion with a bottom. Therefore, the tray is designed to have a width wider than the diameter of the disk. As a result, in the conventional disk unit, the tray has a large dimension in width so that the entire disk unit becomes large in size, thus making it difficult to downsize the conventional disk unit.

Therefore, there has been developed a disk unit including a recording medium loading device that dispenses with the above-described motor and transmission mechanism and has a tray moved manually into a disk loading or housing position inside a chassis or out to a disk ejection position outside the chassis.

FIG. 1 is a diagram showing a disk unit 100 of this type. The disk unit 100 has a recording medium loading device that includes a tray 102 on which a disk (not shown) is placed and a chassis 110 movably holding the tray 102. The tray 102 has its one side portion cut off so that a part of the disk protrudes from the tray 102.

Specifically, the tray 102 is guided by a guide rail mechanism 104 so that the disk is movable with respect to the chassis 110 between an ejected position and a housed position. Here, the ejected position refers to a position of the tray 102 in which position the disk is placed on or removed from the tray 102, and the housed position refers to a position of the tray 102 in which position the tray 102 is housed in a housing part 103 of the chassis 110.

The chassis 110 includes a cover part 110a that covers the protruding part of the disk when the tray 102 is in the housed position. This structure allows the tray 102 to have a smaller dimension in width, thus realizing a smaller disk unit.

An optical pickup 105 and a turntable 106 are provided in the tray 102. Therefore, a printed board 102 provided in the chassis 110 and including a variety of electronic components for data reproduction are electrically connected with the optical pickup 105 and the turntable 106 by an FPC (Flexible Printed Circuit) 109.

Here, if the disk is easily moved when the tray 102 is in the housed position for data reproduction, this prevents good data reproduction. Therefore, the recording medium loading device includes a lock mechanism for locking the movement of the tray 102 in the housed position.

This lock mechanism includes a lock arm 107, a solenoid 108, an eject switch 117, and a lock pin 119. The lock arm 107 is attached rotatably to the chassis 110 and includes a lock claw 107a and a connection part 107b. The lock claw 107a engages the lock pin 119 provided on the tray 102, and the connection part 107b is connected with the solenoid 108.

When the tray 102 is moved in the X2 direction of FIG. 1 to the housed position, the lock claw 107a engages the lock pin 119 to lock the movement of the tray 102. In this locked state, the tray 102 engages a position sensor 125 provided on the printed board 122. Thereby, it is sensed that the tray 102 reaches the housed position. Further, when the tray 102 is in the housed position, a coil spring 126 provided in the chassis 110 is pressed by the tray 102 to be in a compressed state.

On the other hand, in order to move the tray 102 from the housed position to the ejected position, a switch button 112 provided in the tray 102 is operated. This switch button 112 is provided in a buttonhole 113 formed in a front bezel 111 of the tray 102. The eject switch 117 is provided in a position opposing the switch button 112 in the tray 102.

The eject switch 117 is fixed to an FPC 118 provided in the tray 102, and is switched ON by pressing the switch button 112. This eject switch 117 is connected to the printed board 122 via the FPC 118 and the FPC 109 electrically connecting the chassis 110 and the tray 102.

As previously described, the solenoid 108 is mechanically connected via the connection part 107b to the lock arm 107, and is electrically connected via the FPC 109 to the printed board 122. When the switch button 112 is switched ON, a controller (not shown) mounted on the printed board 122 switches a solenoid-driving transistor (not shown) ON so that the solenoid 108 turns the lock arm 107 in the clockwise direction of FIG. 1.

Therefore, by switching the switch button 112 ON, the lock arm 107 is turned to disengage the lock claw 107a from the lock pin 119. Thereby, a lock set on the tray 102 by the lock arm 107 is released to set the tray 102 movable in the X1 direction of FIG. 1.

Since the tray 102 in the housed position compresses the coil spring 126 as previously described, the tray 102 is pressed out in the X1 direction by the elastic restoring force of the coil spring 126 when the lock on the tray 102 is released. As a result, a part of the tray 102 protrudes from the chassis 110. An operator holds the protruding part of the tray 102 to pull out the tray 102 to the ejected position. Thereby, the tray 102 reaches the ejected position.

An LED (Light-Emitting Diode) 114 is provided to the side of the switch button 112. When the disk unit 100 is in operation, the LED 114 emits light to inform the operator that the disk unit 100 is in operation. For this purpose, the front bezel 111 has an LED hole 115 formed therein so that the LED 114 is provided in the LED hole 115. The LED 114 is provided on the FPC 118 to be connected via the FPCs 118 and 109 to the printed board 122.

As described above, in the conventional recording medium loading device, the eject switch 117 is switched ON by operating the switch button 112 so that the solenoid 108 is actuated to release the lock on the tray 102. That is, the conventional recording medium loading device releases the lock on the tray 102 by an electrical means.

However, if the lock on the tray 102 is released only by the electrical means, the tray 102 cannot be unlocked and consequently, the disk cannot be extracted from the disk unit 100 if the FPCs 109 and 118, for instance, become defective to prevent the actuation of the solenoid 108 (hereinafter, such a state is referred to as an emergency state). Therefore, the conventional recording medium loading device includes an emergency lock release mechanism so that the lock set on the tray 102 by the lock arm 107 can be released even in the emergency state.

The emergency lock release mechanism includes an emergency rod 120 and an emergency lever 123. The emergency rod 120 is a rod-like member and is provided in the tray 102 to be movable in the X1 and X2 directions of FIG. 1. The emergency rod 120 has one end part thereof in the X1 direction opposed to an ejecting operation hole 121 formed in the front bezel 111.

The emergency lever 123 is a center-bent rod-like member and is rotatably supported by a spindle 124 provided upright in the chassis 110. When the tray 102 is locked in the housed position, the emergency lever 123 has an end part 123a thereof opposed to the other end part of the emergency rod 120 in the X2 direction of FIG. 1. The emergency lever 123 has the other end 123b thereof connected to the connection part 107b of the lock arm 107.

The emergency lock release mechanism of the above-described structure serves to release the lock set on the tray 102 by the lock arm 107 if the recording medium loading device enters the emergency state. That is, if the recording medium loading device enters the emergency state, the operator inserts a thin rod-like member into the ejecting operation hole 121 to move the emergency rod 120 in the X2 direction of FIG. 1.

As previously described, the emergency rod 120 has its X2 end part opposed to the end part 123a of the emergency lever 123. Therefore, the emergency rod 120 is moved in the X2 direction of FIG. 1 to turn the emergency lever 123 in the counterclockwise direction of FIG. 1 on the spindle 124.

Thus, the emergency lever 123 is turned so that the end part 123b presses the connection part 107b of the lock arm 107. Consequently, the lock arm 107 is turned in the clockwise direction of FIG. 1 by the manual operation of the operator to disengage the lock claw 107a from the lock pin 119. Thereby, the lock set on the tray 102 by the lock arm 107 can be manually released.

However, in the above-described conventional recording medium loading device, the solenoid 108 is electrically actuated by operating the eject switch 117 so as to release the lock set on the tray 102 by the lock arm 107. Therefore, the conventional recording medium loading device requires the emergency rod 120 and the emergency lever 123, that is, the emergency lock release mechanism, in case electronic components such as the eject switch 117, the solenoid 108, and the FPCs 109 and 118 should become defective, that is, in case of the emergency state. However, this complicates the structure of the recording medium loading device, thus causing problems such as increases in the number of components, a device size, and production costs.

Further, the conventional recording medium loading device has the problem of a low electrostatic characteristic due to the close arrangement of the front bezel 111 and the eject switch 117. That is, arranging the eject switch 117 adjacently to the front bezel 111 generates static electrical discharge between the operator and the eject switch 117 when the operator operates the switch button 112, for instance. As a result, the eject switch 117 and other electronic components (such as electronic components mounted on the printed board 122) connected via the FPCs 118 and 109 to the eject switch 117 may be broken by static electricity.

The static electrical discharge is apt to occur particularly because the front bezel 111 contains a number of holes such as the buttonhole 113 for accommodating the switch button 112 and the ejecting operation hole 121 for operating the emergency rod 120.

Further, the conventional recording medium loading device has the LED 114 provided in the front bezel 111. Therefore, the interconnection lines of the LED 114 should be long enough to run from the printed board 122 to the front bezel 111 via the FPCs 109 and 118. This requires the recording medium loading device to employ the FPCs 109 and 118 each made costly for the increased number of the interconnection lines.

Moreover, since a driving circuit for the LED 114 is formed on the printed board 122, a long distance between the printed board 122 and the LED 114 causes the attenuation of an LED driving current in each of the FPCs 109 and 118. Therefore, the driving circuit for the LED 114 has to supply a high current to the LED 114 for this attenuation, thus resulting in an increase in current consumption.

Furthermore, since the LED 114 serving as a light-emitting means is provided in the front bezel 111, static electrical discharge is generated between the operator and the LED 114 through the LED hole 115 when the operator operates the front bezel 111 or the switch button 112. This may lead to the breakage of electronic components provided in the disk unit 100.

In addition, as described above, the conventional recording medium loading device includes the emergency lock release mechanism including the emergency rod 120 and the emergency lever 123 for the emergency state. However, this complicates the structure of the conventional recording medium loading device, thus causing the problems of increases in the number of components, the size, and the production costs of the recording medium loading device.

SUMMARY OF THE INVENTION

It is a general object of the present invention to provide a recording medium loading device in which the above-described disadvantages are eliminated.

A more specific object of the present invention is to provide a downsized recording medium loading device of a simple structure which device can prevent static electricity from damaging its electronic components.

The above objects of the present invention are achieved by a recording medium loading device including: a chassis; a movable unit for holding a recording medium, the movable unit being movable between a housed position in which the movable unit is housed in the chassis and an ejected position to which the movable unit is ejected from the chassis; and a lock unit including: a lock member movable between a locking position to lock the movable unit in the housed position and an unlocking position to unlock the movable unit; and an operation member including an operation part and an engaging part engaging the lock member, the operation part being manually operated to move the operation member so that the operation member moves the lock member from the locking position to the unlocking position by applying force to the lock member through the engaging part.

According to the above-described recording medium loading device, the lock set by the lock mechanism on the movable unit in the housed position can be released by manually operating the operation part of the operation member. Therefore, a conventional electric eject switch can be dispensed with, thereby increasing the resistance of the recording medium loading device to static electricity so that the electronic components of the recording medium loading device are prevented from being damaged by static electrical discharge that would occur between an operator and the eject switch.

Further, along with the electric eject switch, connectors and interconnection lines electrically connecting a printed board provided in the chassis and the eject switch provided in the movable unit also become unnecessary. Therefore, the recording medium loading device can reduce the number of its components and individual defects of the wiring parts, thereby increasing the reliability of the recording medium loading device.

Furthermore, an emergency rod and an emergency lever, which are provided in case of a failure of the eject switch, can be dispensed with. This also reduces the number of the components of the recording medium loading device.

In addition, an emergency hole formed in a front bezel of the movable unit for operating the emergency lever can be dispensed with, thereby preventing static electricity from being discharged via the emergency hole into the recording medium loading device.

The above objects of the present invention are also achieved by a recording medium loading device including: a chassis; a movable unit for holding a recording medium, the movable unit being movable between a housed position in which the movable unit is housed in the chassis and an ejected position to which the movable unit is ejected from the chassis; a light-emitting part provided in the chassis; and a light-displaying member letting light traveling therethrough and provided in the movable unit, the light-displaying member including a light-receiving part opposing the light-emitting part to receive light emitted therefrom when the movable unit is in the housed position and a display part displaying the light received by the light-receiving part so that the light is visually recognizable from outside the movable unit.

According to the above-described recording medium loading device, the light-emitting part is provided in the chassis so that the number of interconnection lines electrically connecting the chassis and the movable unit can be reduced. Therefore, the production costs of the recording medium loading device can be reduced. Further, interconnection lines for the light-emitting part can be allocated to other signals, thus improving the signal-to-noise ratios of the signals.

Moreover, in a conventional recording medium loading device having an LED provided in a front side of the movable unit, static electrical discharge occurs between the LED and an operator, which may lead to breakage of the electronic components of a disk unit. However, according to the above-described recording medium loading device, the light-emitting part is provided in the chassis. This prevents static electrical discharge from occurring between the operator and the light-emitting part, thereby preventing the static electrical discharge from damaging the electronic components of the disk unit.

Additionally, the above-described recording medium loading device may include a lock unit including a lock member movable between a locking position to lock the movable unit in the housed position and an unlocking position to unlock the movable unit, and the above-described light-displaying member may be movable between first and second positions, the light-displaying member applying force to the lock member so as to move the lock member from the locking position to the unlocking position by moving from the first position to the second position.

According to such a recording medium loading device, since the light-displaying member forms a part of the lock unit, the light-displaying member has a function of locking and unlocking the movable unit as well as a function of displaying light. This reduces the number of the components, simplifies the structure, and decreases the size of the recording medium loading device.

The above objects of the present invention are further achieved by a recording medium loading device including: a chassis; a movable unit for holding a recording medium, the movable unit being movable between a housed position in which the movable unit is housed in the chassis and an ejected position to which the movable unit is ejected from the chassis; an operation member movable with respect to the movable unit and manually operated to move from a first position to a second position; a detection part provided in the chassis and detecting at least a movement of the operation member from the first position to the second position by detecting the operation member; and a lock release part releasing a lock set on the movable unit by the lock unit based on a detection result provided by the detection part.

According to the above-described recording medium loading device, the detection part detects the movement of the manually operated operation member and, based on the detection result provided by the detection part, the lock release part releases the lock set on the movable unit by the lock unit. Therefore, it is no more necessary to provide an electric switch in the movable unit, thus increasing the resistance of the recording medium loading device to static electricity.

Further, since the detection part detecting the movement of the operation member is provided in the chassis, there is a distance between an operator and the detection part at a time of a lock release operation. Therefore, static electrical discharge is prevented from occurring between the operator and the detection part, thereby preventing the electronic components of the recording medium loading device from being damaged.

Additionally, the detection part may include a single detection switch that detects at least a first state in which the operation member is in the first position and a second state in which the operation member is in the second position.

According to such a recording medium loading device, the first and second states of the operation member can be detected by the single detection switch, thus reducing the number of components and production costs compared with a device employing different switches to detect the first and second states.

BRIEF DESCRIPTION OF THE DRAWINGS

Other objects, features and advantages of the present invention will become more apparent from the following detailed description when read in conjunction with the accompanying drawings, in which:

FIGS. 3(A) through 3(C) are a top plan view, a side view, and a front view of the disk unit with the tray being in a housed position, respectively;

FIGS. 18A and 18B are a top plan view and a front view of the disk unit with the tray being in a housed position, respectively;

FIG. 18C is an enlarged view of a part of the disk unit indicated by arrow G in FIG. 18A;

DETAILED DESCRIPTION OF THE PREFERRED EMBODIMENTS

Next, a description will be given, with reference to the accompanying drawings, of embodiments of the present invention.

Figure 2:
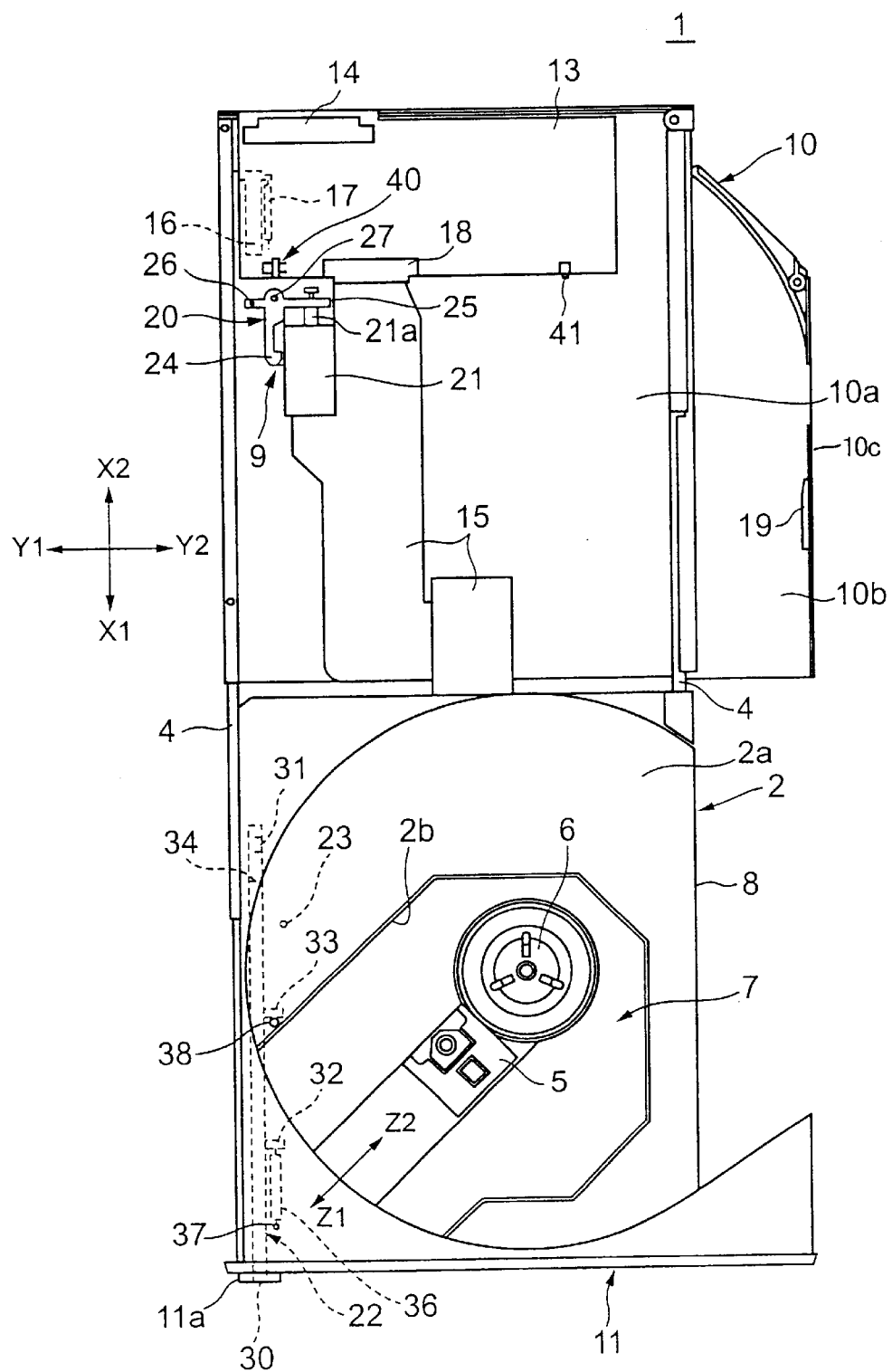
FIG. 2 is a diagram showing a disk unit including a recording medium loading device according to a first embodiment of the present invention with a tray being in an ejected position.

FIGS. 2 and 3A through 3C shows a disk unit 1 including a recording medium loading device according to a first embodiment of the present invention. FIG. 2 is a top plan view of the disk unit 1 with a tray 2 (a movable unit) being ejected from a chassis 10. Hereinafter, a state shown in FIG. 2 is referred to as an ejected state, and a position of the tray 2 in this state is referred to as an ejected position. FIGS. 3A through 3C are a top plan view, a side view, and a front view of the disk unit 1 with the tray 2 being housed in the chassis 10, respectively. Hereinafter, a state shown in FIGS. 3A through 3C is referred to as a housed state, and a position of the tray 2 in this state is referred to as a housed position. This disk unit 1 is a built-in-type device that is housed, for instance, in the housing of a notebook computer (not shown).

As shown in FIGS. 2 and 3A through 3C, the disk unit 1 includes the tray 2, a guide rail mechanism 4, a turntable 6, a pickup assembly 7, a lock mechanism 9 (a lock unit), and the chassis (housing) 10. In FIGS. 2 and 3A through 3C, a roof plate provided to cover the upper part of the chassis 10 is removed therefrom and is not shown. The recording medium loading device includes the tray 2 and the chassis 10.

The tray 2 is provided with the turntable 6, the pickup assembly 7, a disk placement part 2a, and an eject rod 22 (an operation member) forming a part of the lock mechanism 9. The tray 2 is movable with respect to the chassis 10 in directions indicated by arrows X1 and X2 in the drawings (hereinafter referred to as X1 and X2 directions, respectively).

That is, the chassis 10 has the guide rail mechanism 4 provided on both side parts thereof, and the guide rail mechanism 4 stretches or retracts in the X1 or X2 directions so that the tray 2 is moved with respect to the chassis 10 in the X1 and X2 directions. Thus, by employing the guide rail mechanism 4, as shown in FIG. 2, the tray 2 can be pulled out in the X1 direction to such an extent that a disk 3 can be easily placed on or removed from the tray 2.

The turntable 6 is provided substantially in the center of the tray 2. The disk 3 is placed on the turntable 3, which is rotated by a spindle motor (not shown) provided under the tray 2. Thereby, the disk 3 placed on the turntable 6 is also rotated. In this embodiment, the disk 3 is rotated at a speed of 32×, so the disk 3 is rotated at a high speed at a time of data reproduction.

The tray 2 includes the pickup assembly 7 that moves an optical pickup 5 in the radial direction of the disk 3, or in directions indicated by arrows Z1 and Z2 in FIG. 2. The optical pickup 5 emits a laser light onto the disk 3 and performs data reproduction by receiving a light reflected therefrom.

A front bezel 11 is provided in the front part of the tray 2. Therefore, the front bezel 11 moves integrally with the tray 2 in the X1 and X2 directions. A convex part 11a protruding outward is formed in close proximity to an end part of the front bezel 11 in a direction indicated by arrow Y1 in the drawings (or a Y1 end part of the front bezel 11). The convex part 11a has a hole 11b (see FIG. 4) formed in a center thereof.

Further, the eject rod 22 is provided in the Y1 side part of the tray 2 to extend in the X1 and X2 directions. Since the eject rod 22 forms a part of the lock mechanism 9, a description of the eject rod 22 will be given later together with the lock mechanism for convenience of description.

The tray 2 of the above-described structure has a width, or a Y1–Y2 dimension in the drawings, smaller than the outside diameter of the disk 3 so that a part of the disk 3 protrudes from the tray 2. In this embodiment, the tray 2 is moved in the X1 and X2 directions between the ejected and housed positions not by a driving means such as a motor but by a manual operation.

This allows the disk unit 1 to dispense with a driving mechanism (formed mainly of a motor and a transmission mechanism) for moving the tray 2. Therefore, the number of components is reduced and the disk unit 1 can be smaller and thinner in size. Further, since the part of the disk 3 protrudes from the tray 2, an operator can hold the protruding part of the disk 3 in placing the disk 3 on or removing the disk 3 from the tray 2. This facilitates the placement and removal of the disk 3.

Next, a description will be given of the chassis 10. The chassis 10 includes a box-like housing part 10a for housing the tray 2 and a cover part 10b for protecting the part of the disk 3 protruding from the tray 2 in the housed state.

A printed board 13 on which an electronic circuit is formed is provided in the housing part 10a. The printed board 13 is electrically connected, by means of a connector 18 and a flexible printed circuit (FPC) 15, to electronic components such as the optical pickup 5 and a motor for rotating the turntable 6 provided in the tray 2. Further, the printed board 13 has a connector 14 and a light-emitting diode (LED) 40 (a light-emitting part) provided thereon. The disk unit 1 is connected via the connector 14 to an external apparatus such as a personal computer. The LED 40 lights and emits light to the eject rod 22 when data is recorded on or reproduced from the disk 3.

By thus electrically connecting the tray 2 and the chassis 10 by means of the FPC 15, electrical connection can be secured between the chassis 10 (the printed board 13) and the tray 2 (the optical pickup 5, the motor, etc.), which is moved with respect to the chassis 10.

On the other hand, the cover part 10b covers the bottom part of the part of the disk 3 protruding from the tray 2. Thereby, the part of the disk 3 which part is not supported by the tray 2 is protected by the cover part 10b. The top part of the protruding part of the disk 3 is protected by the roof plate (not shown) provided on the chassis 10.

The cover part 10b includes a sidewall 10c on which a braking member 19 is provided. The braking member 19 is formed of, for instance, an elastic material and comes into contact with the periphery of the disk 3 when the tray 2 containing the disk 3 is slid from the housed position to the ejected position.

Thereby, the disk 3 rotated at a high speed for data reproduction or recording in the tray 2 in the housed position comes into contact with the braking member 19 as the tray 2 is slid in the X1 direction so that the rotation of the disk 3 is braked. Therefore, when the tray 2 is moved from the housed position to the ejected position, the disk 3 is always stationery and, accordingly, is prevented from being damaged.

The chassis 10 includes an eject slider 16 and a coil spring 17. The eject slider 16 and the coil spring 17 are provided in the Y1 side part of the chassis 10 under the printed board 13. When the tray 2 is in the housed position, the tray 2 has its X2 end part placed in contact with and pressing the eject slider 16.

The coil spring 17 always provides the eject slider with a force in the X1 direction. Therefore, when the tray 2 is in the housed position, the tray 2 presses the eject slider 16 so that the coil spring 17 stores elastic force.

If the tray 2 is ejected from the chassis 10 unintentionally at a time of reproduction, the disk 3, and components and devices forming the disk unit 1 may be damaged. Therefore, the recording medium loading device includes the lock mechanism 9 to prevent the tray 2 from being ejected from the chassis 10 at the time of reproduction, that is, when the tray 2 is in the housed position. A description will be given below of the lock mechanism 9 with reference to FIG. 4 as well as FIGS. 2 and 3A through 3C.

The lock mechanism 9 includes a lock arm 20 (a lock member), a solenoid 21, the eject rod 22, and a lock pin 23.

The lock arm 20 is mounted turnably on a spindle 27 provided upright in the chassis 10. The lock arm 20 includes a lock claw 24, a connection part 25, and a lock release pin 26 that are formed integrally with one another. The lock claw 24 engages the lock pin 23 provided in the tray 2. The connection part 25 is connected to a drive pin 21a of the solenoid 21. Further, as shown enlarged in FIG. 4, the lock release pin 26 protrudes upward to engage the eject rod 22.

When the tray 2 is moved in the X2 direction to the housed position, the lock claw 24 of the lock arm 20 engages the lock pin 23 to set a lock on the movement of the tray 2. This prevents the tray 2 from being ejected from the chassis 10 at a time of data reproduction from the disk 3, thus protecting the disk 3 and preventing the devices forming the disk unit 1 from being damaged.

Further, when the tray 2 is locked in the housed position, the tray 2 engages an eject detection switch 41 provided on the printed board 13. This structure allows a controller (not shown) for controlling the operation of the disk unit 1 to determine, based on a signal supplied from the eject detection switch 41, whether the tray 2 is in the housed position or in the ejected position.

Figure 4:
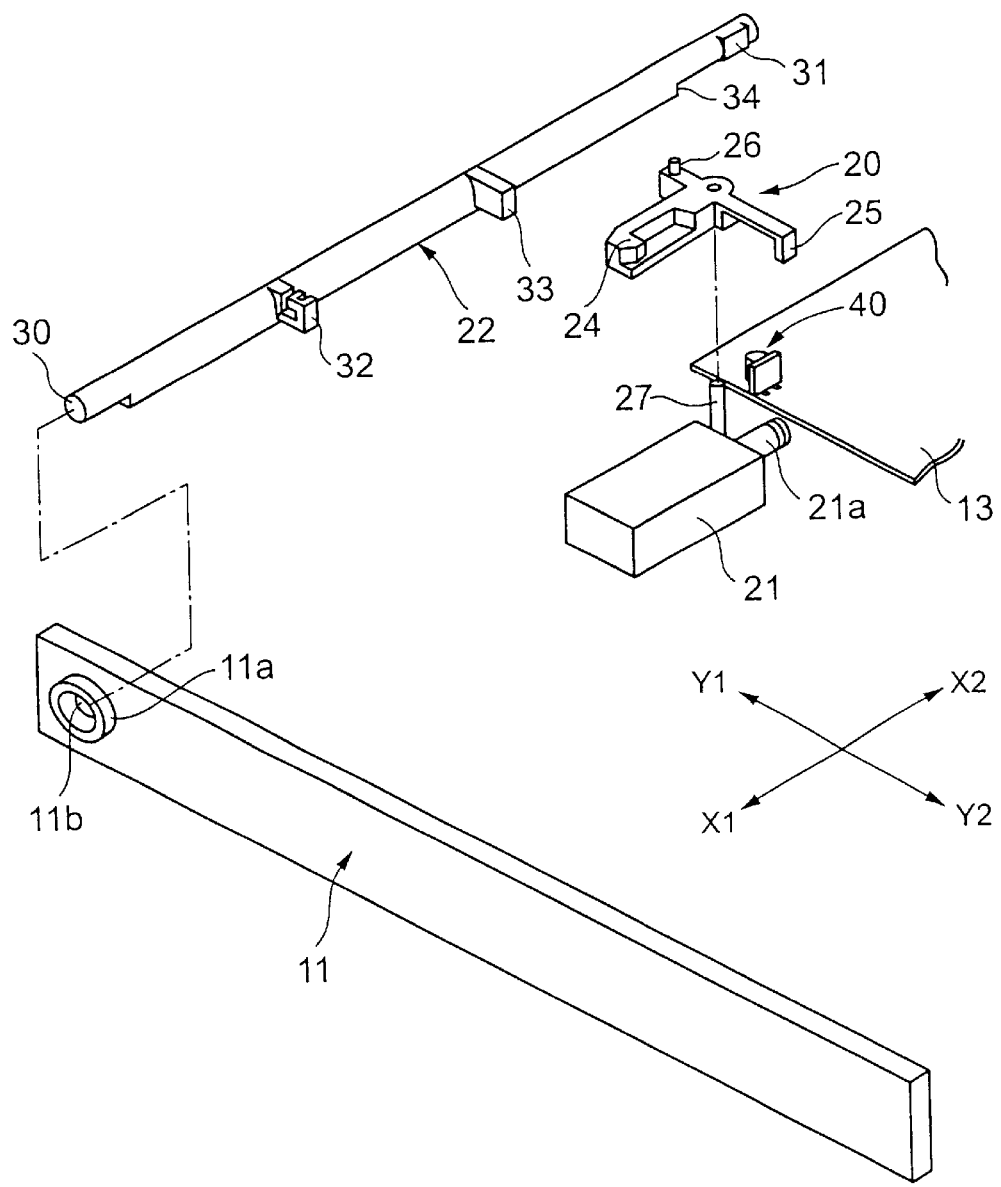
FIG. 4 is an exploded perspective view of a lock mechanism included in the recording medium loading device.

The eject rod 22, which extends in the X1 and X2 directions in the Y1 side part of the tray 2, substantially has a round rod shape as shown enlarged in FIG. 4. The eject rod 22 includes an operation and light-emitting part 30 (an operation part), a light-receiving part 31, a spring-hooking part 32, an engaging convex part 33, and an engaging step part 34 (an engaging part) that are formed integrally with one another. The eject rod 22 is made of such a material as to let light travel therethrough, such as an acrylic resin.

The eject rod 22 of the above-described structure is guided by a guide (not shown) provided in the tray 2 to be movable in the X1 and X2 directions. A coil spring 36 is provided between the spring-hooking part 32 and a spring-hooking pin 37 provided upright in the tray 2. The coil spring 36 always provides the eject rod 22 with a force in the X1 direction.

However, the engaging convex part 33 formed on the eject rod 22 engages a boss 38 formed in the tray 2, thereby preventing the eject rod 22 form being moved further in the X1 direction. In this state, the operation and light-emitting part 30 formed on the X1 end part of the eject rod 22 protrudes to some extent from the hole 11b formed in the front bezel 11.

Therefore, when the operator presses the operation and light-emitting part 30, the eject rod 22 is moved in the X2 direction against the elastic force of the coil spring 36. The amount of protrusion of the operation and light-emitting part 30 from the hole 11b is set to be smaller than the amount of protrusion of the convex part 11a formed to surround the hole 11b, thus preventing an unintentional operation of the operation and light-emitting part 30.

The light-receiving part 31 is mirror-finished and is formed on the side of the eject rod 22. As shown in FIG. 3A, the light-receiving part 31 opposes the LED 40 provided on the printed board 13 when the tray 2 is in the housed position. Therefore, when the LED 40 opposes the light-receiving part 31 and is turned on, the LED 40 emits light to the light-receiving part 31.

When the light-receiving part 31 receives the light emitted from the LED 40, the light enters the eject rod 22 to travel in the X1 direction inside the eject rod 22. Therefore, the operator is allowed to see the light emitted from the LED 40 from the operation and light-emitting part 30. As previously described, the LED 40 lights up when data is reproduced from the disk 3. Therefore, the operator can determine, based on the presence or absence of light from the operation and light-emitting part 30, whether the data is reproduced from the disk 3.

As described above, according to this embodiment, the LED 40 is provided on the printed board 13 included in the chassis 10 so that the number of interconnection lines electrically connecting the chassis 10 and the tray 2 can be reduced. That is, the number of the interconnection lines of the FPC 15 can be reduced. Therefore, if the number of the interconnection lines of the FPC 15 is reduced, the production costs of the FPC 15 can be decreased. If the number of interconnection lines for the LED 40 remains unchanged, idle interconnection lines can be used for other signals, thereby improving the signal-to-noise ratios of the signals.

A driving circuit for driving the LED 40 is provided on the printed board 13. Therefore, by providing the LED 40 on the printed board 13 including the driving circuit as in this embodiment, there is no more need to consider the attenuation of an LED driving current, thus improving the luminous efficacy of the LED 40 and reducing current consumption in the recording medium loading device.

As previously described, in the conventional disk unit 100, where the LED 114 is provided in the front bezel 111, static electrical discharge is generated between the operator and the LED 114, which may lead to the breakage of the electronic components provided in the disk unit 100. However, according to the disk unit 1 of this embodiment, the LED 40 is provided in the chassis 10 so that there is a considerable distance between the LED 40 and the operator. This prevents static electrical discharge from being generated between the LED 40 and the operator, thus preventing electronic components provided in the disk unit 1 from being damaged.

Further, the conventional LED 114, which is directly mounted on the flexible and easily deformable FPC 118, has low mounting reliability. On the other hand, since the LED 40 of this embodiment is provided on the printed board 13 that is a hard substrate, the LED 40 has higher mounting reliability.

Next, a description will be given of an operation of the above-mentioned lock mechanism 9.

First, a description will be given of an operation of moving the tray 2 from the ejected position shown in FIG. 2 to the housed position shown in FIG. 3A. In order to move the tray 2 to the housed position, the operator holds the front bezel 11 and moves the tray 2 in the X2 direction. Thereby, the tray 2 is moved in the X2 direction, being guided by the guide rail mechanism 4. At this point, the eject rod 22 has been moved in the X1 direction, and the operation and light-emitting part 30 protrudes to some extent from the hole 11b formed in the front bezel 11 with the engaging convex part 33 contacting the boss 38.

When the tray 2 is moved up to the housed position, the lock pin 23 provided in the tray 2 engages the lock claw 24 of the lock arm 20. In this state, the tray 2 is locked to the chassis 10 by the lock mechanism 9 so as to be prevented from being moved in the X1 direction.

The tray 2 is moved up to the housed position to engage the eject detection switch 41, which then informs the control device for controlling the disk device 1 that the tray 2 is in the housed position. Further, the tray 2 has its X2 end part pressing the eject slider 16 so that the coil spring 17 presses the tray 2 in the X1 direction through the eject slider 16.

Here, with the tray 2 being in the housed position, the eject rod 22 has its light-receiving part 31 opposing the LED 40. Therefore, when the LED 40 lights, as previously described, the light emitted from the LED 40 enters the eject rod 22 from the light-receiving part 31 to travel inside the eject rod 22 so that the lighting of the LED 40 can be visually recognized from the operation and light-emitting part 30.

Further, in the housed state, the engaging step part 34 formed in the eject rod 22 is positioned next to the lock release pin 26 formed on the lock arm 20. This structure is illustrated in detail in FIG. 3B. Specifically, the engaging step part 34 is formed like a chip in the X2 end part of the eject rod 22 so that the lock release pin 26 is positioned where the engaging step part 34 is formed.

In the above-described housed state, the disk unit 1 performs data reproduction from the disk 3 placed on the tray 2. Since the operation and light-emitting part 30 emits light when the data reproduction is performed, the operator can recognize that the disk unit 1 is in a data reproduction state by the light emitted from the operation and light-emitting part 30.

Next, a description will be given of an operation of ejecting from the chassis 10 the tray 2 in the housed state shown in FIG. 3A (an eject operation).

In order to eject the tray 2 from the chassis 10, a lock set on the tray 2 by the lock mechanism 9 is released. The recording medium loading device has two modes of performing this eject operation, that is, a manual eject operation and an electric eject operation.

The manual eject operation is performed by the operator. On the other hand, the electric eject operation is forcibly performed, for instance, when the disk unit 1 receives a disk eject command from a personal computer to which the disk unit 1 is connected.

In order to release the lock set on the tray 2 by the lock mechanism 9 by the manual eject operation, the operator presses, in the X2 direction, the operation and light-emitting part 30 protruding from the front bezel 11. Thereby, the eject rod 22 is moved in the X2 direction against the elastic force of the coil spring 36 so that the engaging step part 34 formed in the eject rod 22 presses the lock release pin 26 of the lock arm 20.

Figure 5:
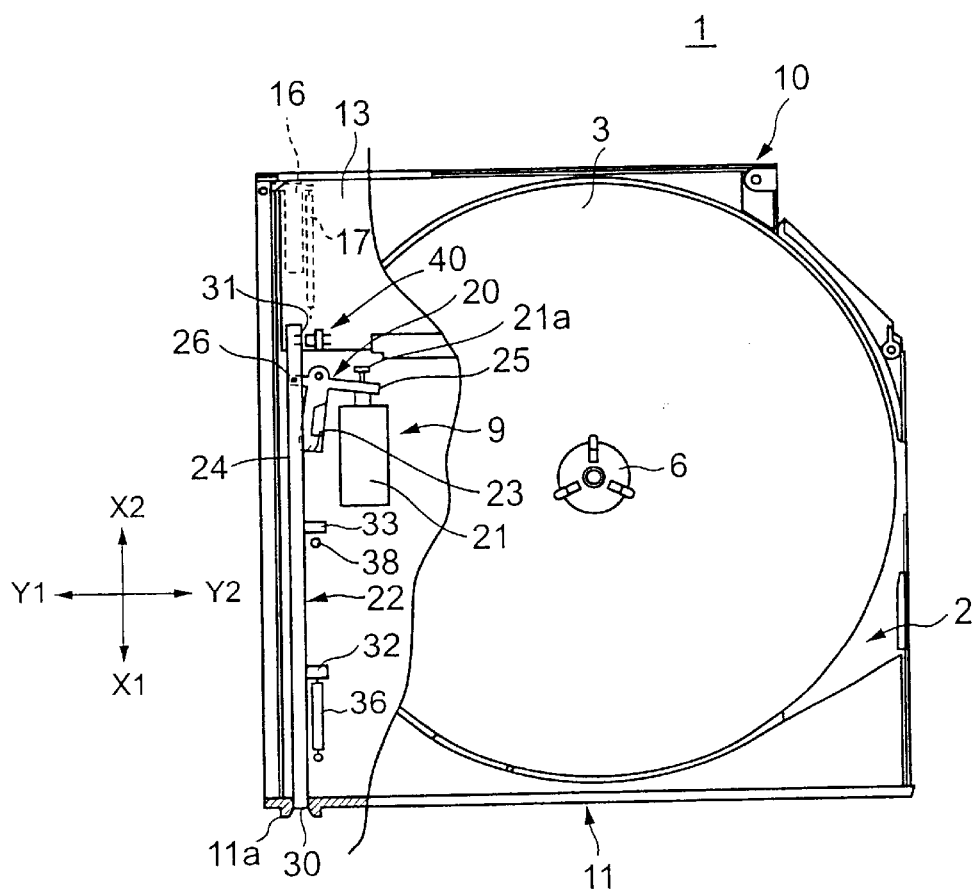
FIG. 5 is a diagram for illustrating a manual eject operation of the recording medium loading device.

By the engaging step part 34 pressing the lock release pin 26, the lock arm 20 is turned in the clockwise direction of FIG. 5 on the spindle 27 so that the lock claw 24 is disengaged from the lock pin 23 as shown in FIG. 5. Thereby, the lock set on the tray 2 by the lock mechanism 9 is released, so that the tray 2 is movable in the X1 direction (toward the ejected position).

As previously described, in the housed state, the coil spring 17 stores the elastic force. Therefore, by releasing the lock set by the lock mechanism 9, the coil spring 17 connected to the eject slider 16 moves the tray 2 in the X1 direction. Thereby, a part of the tray 2 on the side of the front bezel 11 protrudes from the chassis 10. The operator holds the part of the tray 2 protruding from the chassis 10 and pulls out the tray 2 up to the ejected position. Thus, the tray 2 is moved up to the ejected position.

As previously described, according to the structure of this embodiment, the lock set on the tray 2 in the housed position by the lock mechanism 9 can be released by manually operating the operation and light-emitting part 30 of the eject rod 22. Therefore, the conventional electric eject switch 117 shown in FIG. 1 can be dispensed with, thereby increasing the resistance of the recording medium loading device to static electricity so that static electrical discharge is reliably prevented from occurring between the operator and electronic components. Therefore, the electronic components of the recording medium loading device are reliably prevented from being damaged by the static electrical discharge.

Further, by dispensing with the electric eject switch 117, the recording medium loading device can reduce the number of its components and individual defects of wiring parts, thereby increasing the reliability of the recording medium loading device. Moreover, the number of the interconnection lines of the FPC 15 can be reduced so that the production costs of the FPC 15 can be decreased.

Furthermore, the emergency rod 120 and the emergency lever 123, which are provided in case of a failure of the eject switch 117, can be dispensed with. This also reduces the number of the components of the recording medium loading device. In addition, the emergency hole 121 can be dispensed with, thereby preventing static electricity from being discharged via the emergency hole 121 into the recording medium loading device.

On the other hand, as previously described, the eject rod 22 has a rod-like shape in this embodiment. Therefore, the eject rod 22 can be provided in the tray 2 without hindering the arrangement of the other components of the tray 2 nor requiring the tray 2 to be larger in size. Further, in this embodiment, the lock set on the tray 2 by the lock mechanism 9 can be released simply by operating the eject rod 22. This simplifies the lock mechanism 9 and also reduces the number of the components of the recording medium loading device.

Moreover, the eject rod 22 serves not only as a part of the lock mechanism 9 but also as a light-displaying member informing the lighting of the LED 40. This also decreases the number of the components, simplifies the structure, and reduces the size of the recording medium loading device.

Figure 6:
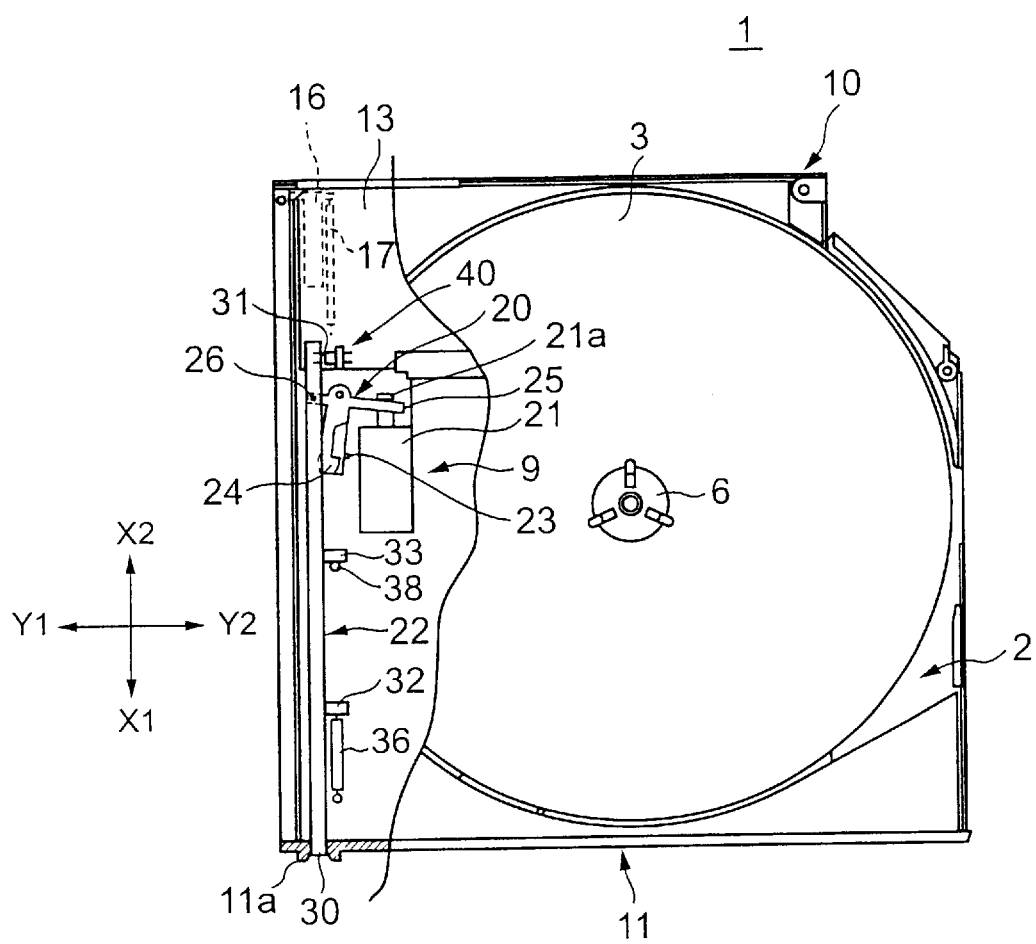
FIG. 6 is a diagram for illustrating an electric eject operation of the recording medium loading device.

On the other hand, the solenoid 21 is actuated to perform the electric eject operation. The solenoid 21 is actuated to move the connection part 25 connected to the drive pin 21a in the X1 direction so that the lock arm 20 is turned in the clockwise direction as shown in FIG. 6. Thereby, the lock claw 24 is disengaged from the lock pin 23 so that the tray 2 becomes movable. Since an operation after the disengagement of the lock claw 24 from the lock pin 23 is equal to that of the manual eject operation, a description thereof will be omitted.

Next, a description will be given of a second embodiment of the present invention. In the following drawings, the same elements as those previously described are referred to by the same numerals.

FIGS. 7 and 8A through 8C show a disk unit 1A including a recording medium loading device according to the second embodiment of the present invention. This disk unit 1A is a built-in-type device that is housed, for instance, in the housing of a notebook computer (not shown).

Figure 7:
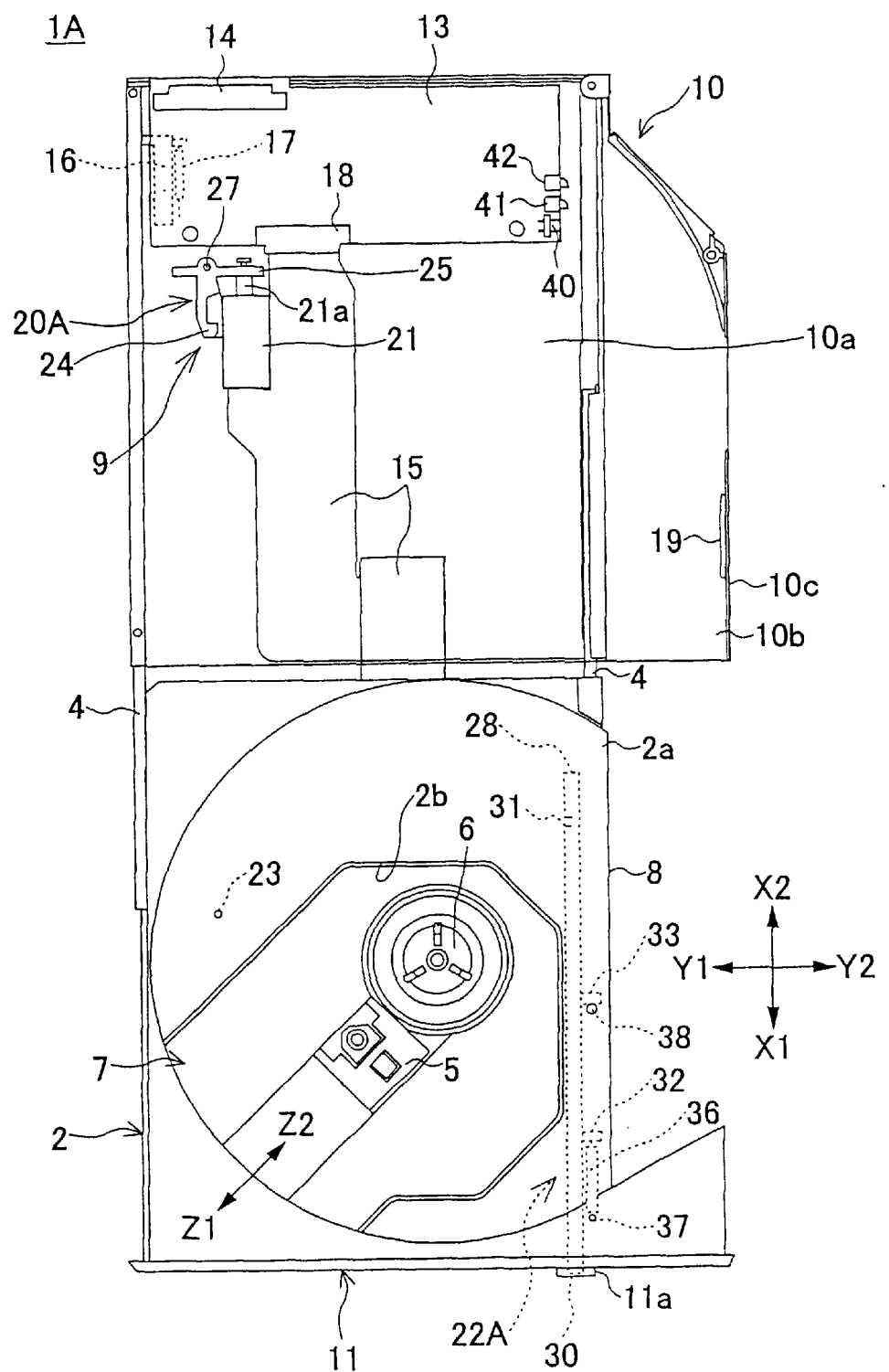
FIG. 7 is a diagram showing a disk unit including a recording medium loading device according to a second embodiment of the present invention with a tray being in an ejected position.
Figure 8A:
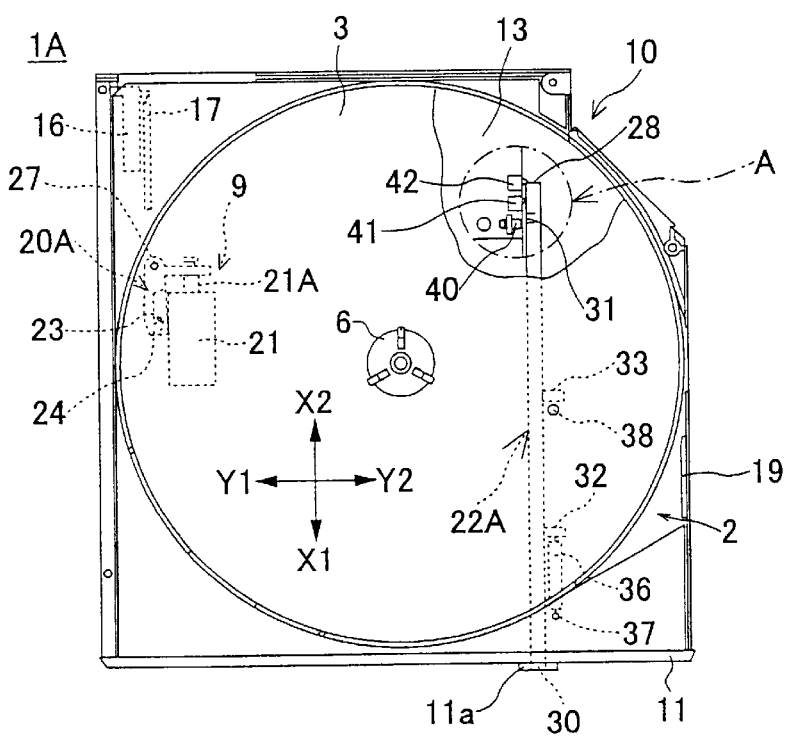
FIGS. 8A and 8B are a top plan view and a front view of the disk unit with the tray being in a housed position, respectively.
Figure 8B:
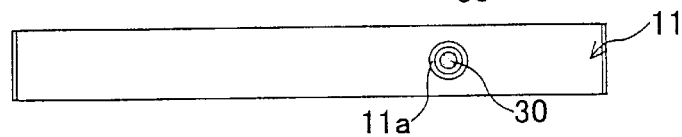
Figure 8C:
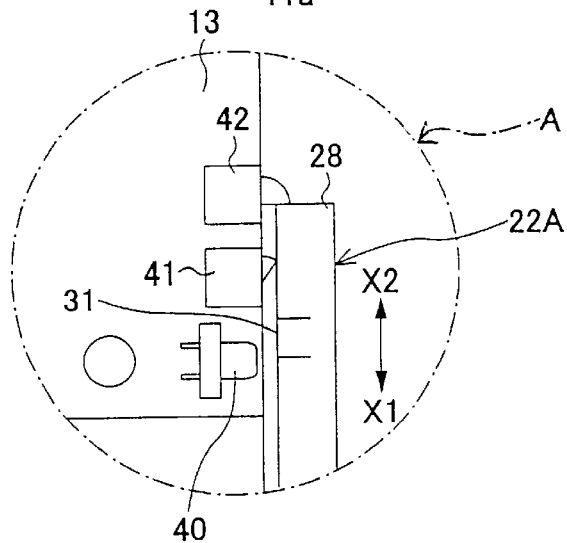
FIG. 8C is an enlarged view of a part of the disk unit indicated by arrow A in FIG. 8A.

FIG. 7 is a top plan view of the disk unit 1A with the tray 2 being ejected from the chassis 10. Hereinafter, a state shown in FIG. 7 is referred to as an ejected state, and a position of the tray 2 in this state is referred to as an ejected position. FIGS. 8A and 8B are a top plan view and a front view of the disk unit 1A with the tray 2 being housed in the chassis 10, respectively. FIG. 8C is an enlarged view of a part of the disk unit 1A indicated by arrow A in FIG. 8A. Hereinafter, a state shown in FIG. 8A is referred to as a housed state, and a position of the tray 2 in this state is referred to as a housed position.

As shown in the drawings, the disk unit 1A includes the tray 2, the guide rail mechanism 4, the turntable 6, the pickup assembly 7, the lock mechanism 9, and the chassis 10. In FIGS. 7 and 8A through 8C, a roof plate provided to cover the upper part of the chassis 10 is removed therefrom and is not shown. The recording medium loading device includes the tray 2 and the chassis 10.

The tray 2 includes the turntable 6, the pickup assembly 7, the disk placement part 2a, and an eject rod 22A (an operation member) forming a part of the lock mechanism 9. The tray 2 is movable in the X1 and X2 directions with respect to the chassis 10.

That is, the chassis 10 has the guide rail mechanism 4 provided on both side parts thereof, and the guide rail mechanism 4 stretches or retracts in the X1 or X2 directions so that the tray 2 is moved with respect to the chassis 10 in the X1 and X2 directions. Thus, by employing the guide rail mechanism 4, as shown in FIG. 7, the tray 2 can be pulled out in the X1 direction to such an extent that a disk 3 can be easily placed on or removed from the tray 2.

The turntable 6 is provided substantially in the center of the tray 2. The disk 3 is placed on the turntable 3, which is rotated by a disk motor 50 (see FIG. 11) provided under the tray 2. Thereby, the disk 3 placed on the turntable 6 is also rotated. In this embodiment, the disk 3 is rotated at a speed of 32×, so the disk 3 is rotated at a high speed at a time of data reproduction.

The tray 2 includes the pickup assembly 7 including a thread motor 52 (see FIG. 11) that moves an optical pickup 5 in the radial direction of the disk 3, or in directions indicated by arrows Z1 and Z2 in FIG. 7. The optical pickup 5 emits a laser light onto the disk 3 and performs data reproduction by receiving a light reflected therefrom.

The front bezel 11 is provided in the front part of the tray 2. Therefore, the front bezel 11 moves integrally with the tray 2 in the X1 and X2 directions. The convex part 11a protruding outward is formed in close proximity to an end part of the front bezel 11 in a direction indicated by arrow Y2 in the drawings (or a Y2 end part of the front bezel 11). The convex part 11a has the hole 11b formed in a center thereof.

Further, the eject rod 22A is provided in the tray 2 to extend in the X1 and X2 directions. Since the eject rod 22A forms a part of a later-described lock release mechanism, a description of the eject rod 22A will be given later together with the lock release mechanism for convenience of description.

The tray 2 of the above-described structure has a width, or a Y1–Y2 dimension in the drawings, smaller than the outside diameter of the disk 3 so that a part of the disk 3 protrudes from the tray 2. In this embodiment, the tray 2 is moved in the X1 and X2 directions between the ejected and housed positions not by a driving means such as a motor but by a manual operation.

This allows the disk unit 1A to dispense with a driving mechanism (formed mainly of a motor and a transmission mechanism) for moving the tray 2. Therefore, the number of components is reduced and the disk unit 1A can be smaller and thinner in size. Further, since the part of the disk 3 protrudes from the tray 2, an operator can hold the protruding part of the disk 3 in placing the disk 3 on or removing the disk 3 from the tray 2. This facilitates the placement and removal of the disk 3.

Next, a description will be given of the chassis 10. The chassis 10 includes the box-like housing part 10a for housing the tray 2 and the cover part 10b for protecting the part of the disk 3 protruding from the tray 2 in the housed state. The printed board 13 on which the electronic circuit is formed is provided in the housing part 10a.

As shown in FIG. 7, the printed board 13 is provided in the X2 end part of the chassis 10. That is, the printed board 13 is provided in the remotest position from the front bezel 11.

The printed board 13 includes the connectors 14 and 18. The connector 14 is connected to a host apparatus 57 (see FIG. 11) such as a personal computer, thereby connecting the disk unit 1A to the host apparatus 57. The connector 18 is electrically connected via the flexible printed circuit (FPC) 15 to electronic components provided in the tray 2, such as the optical pickup 5, a disk motor servo circuit 51, and the thread motor 52.

By thus electrically connecting the tray 2 and the chassis 10 by means of the FPC 15, electrical connection can be secured between the chassis 10 (the printed board 13) and the tray 2 (the optical pickup 5, the disk motor 50, the thread motor 52, etc.), which is moved with respect to the chassis 10.

Further, the LED 40, a tray switch 41, and an eject switch 42 are provided on the printed board 13. The tray switch 41 and the eject switch 42 form the later-described lock release mechanism, and engage the eject rod 22A to detect a state of the tray 2.

As will be described later, the LED 40 lights and emits light to the eject rod 22A when data is reproduced from the disk 3. A detailed description of the tray switch 41, the eject switch 42, and the LED 40 will be given later for convenience of description.

On the other hand, the cover part 10b covers the bottom part of the part of the disk 3 protruding from the tray 2. Thereby, the part of the disk 3 which part is not supported by the tray 2 is protected by the cover part 10b. The top part of the protruding part of the disk 3 is protected by the roof plate (not shown) provided on the chassis 10.

The cover part 10b includes the sidewall 10c on which the braking member 19 is provided. The braking member 19 is formed of, for instance, an elastic material and comes into contact with the periphery of the disk 3 when the tray 2 containing the disk 3 is slid from the housed position to the ejected position.

Thereby, the disk 3 rotated at a high speed for data reproduction or recording in the tray 2 in the housed position comes into contact with the braking member 19 as the tray 2 is slid in the X1 direction so that the rotation of the disk 3 is braked. Therefore, when the tray 2 is moved from the housed position to the ejected position, the disk 3 is always stationery and, accordingly, is prevented from being damaged.

The chassis 10 includes the eject slider 16 and the coil spring 17. The eject slider 16 and the coil spring 17 are provided in the Y1 side part of the chassis 10 under the printed board 13. When the tray 2 is in the housed position, the tray 2 has its X2 end part placed in contact with and pressing the eject slider 16.

The coil spring 17 always provides the eject slider with a force in the X1 direction. Therefore, when the tray 2 is in the housed position, the tray 2 presses the eject slider 16 so that the coil spring 17 stores elastic force.

Figure 11:
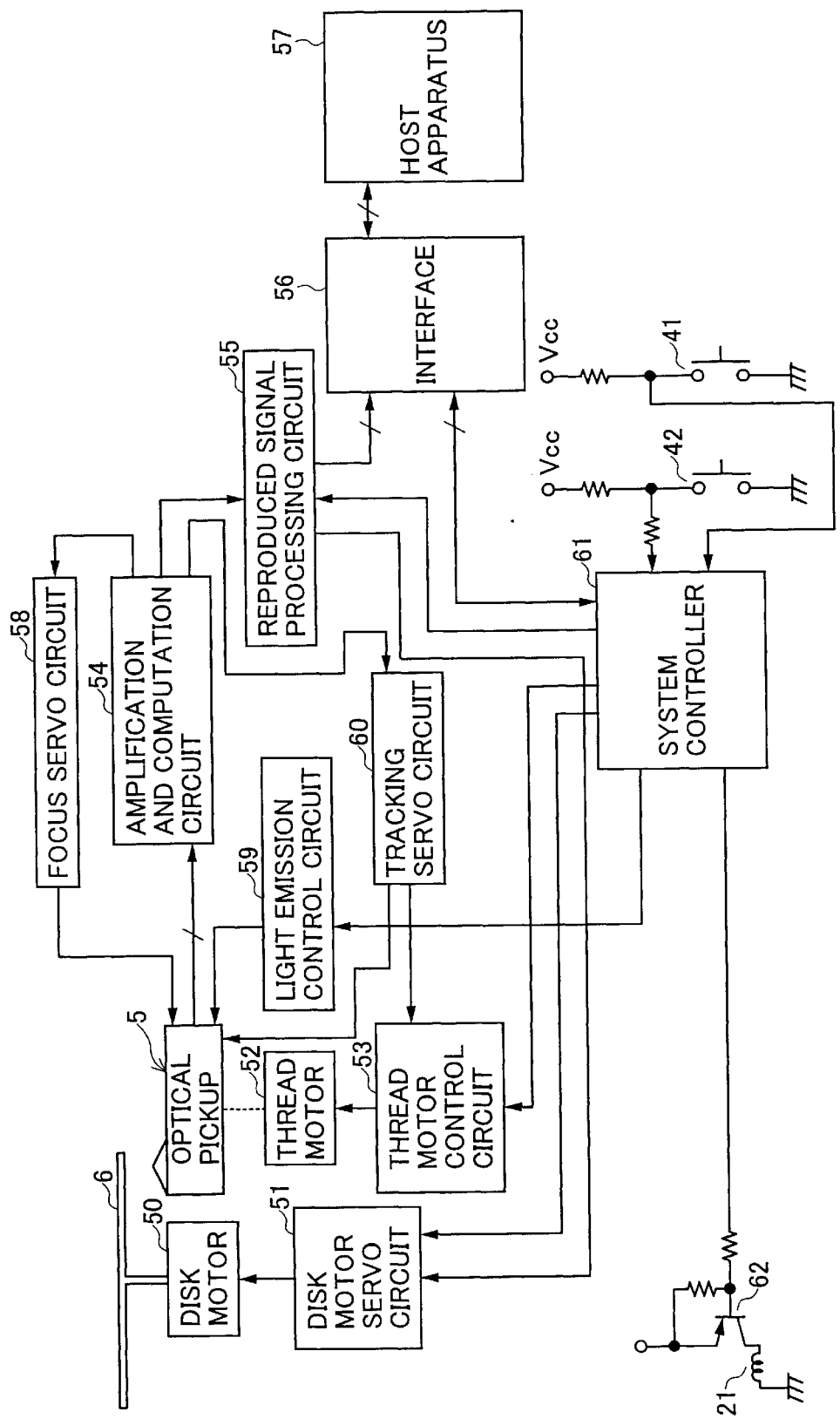
FIG. 11 is a block diagram showing a circuit structure of the disk unit.

FIG. 11 shows a circuit structure of the disk unit 1A. As shown in FIG. 11, the disk motor 50 rotating the turntable 6 is connected via the disk motor servo circuit 51 to a system controller 61 and a reproduced signal processing circuit 55, and is controlled so as to rotate the turntable 6 at a constant speed.

The thread motor 52 actuating the optical pickup 5 is also connected via a thread motor control circuit 53 to the system controller 61, which, together with a light emission control circuit 59, controls the actuation of the optical pickup 5.

A detection signal detected in the optical pickup 5 is amplified in an amplification and computation circuit 54 and thereafter is supplied to the reproduced signal processing circuit 55, a focus servo circuit 58, and a tracking servo circuit 60. The reproduced signal processing circuit 55 generates the reproduced signal of the disk 3 from the detection signal detected in the optical pickup 5.

The generated reproduced signal is supplied via an interface 56 to the host apparatus 57. At this point, the reproduced signal processing circuit 55 is connected to the system controller 61 so that the system controller 61 controls the transmission of the reproduced signal to the host apparatus 57.

The focus servo circuit 58 and the tracking servo circuit 60 generates, based on the detection signal detected in the optical pickup 5, a focus servo signal and a tracking servo signal, respectively. The focus servo and tracking servo signals are supplied to the optical pickup 5 and the thread motor control circuit 53 so that the optical pickup 5 is properly actuated.

The above-described tray switch 41 and the eject switch 42 are also connected to the system controller 61. Further, the solenoid 21 forming the later-described lock mechanism 9 is also connected to the system controller 61.

If the tray 2 is ejected from the chassis 10 unintentionally at a time of reproduction, the disk 3, and components and devices forming the disk unit 1A may be damaged. Therefore, the recording medium loading device includes the lock mechanism 9 to prevent the tray 2 from being ejected from the chassis 10 at the time of reproduction, that is, when the tray 2 is in the housed position. In order to eject the tray 2 properly from the chassis 10 at the end of the reproduction, the lock release mechanism for releasing a lock set by the lock mechanism 9 is also provided.

A description will be given below of structures and operations of the lock mechanism 9 and the lock release mechanism with reference to FIGS. 7 through 10B.

The lock mechanism 9 includes a lock arm 20A, the solenoid 21, the eject rod 22A, the tray switch 41, and the eject switch 42. The lock release mechanism includes the eject rod 22A, the tray switch 41, the eject switch 42, and the system controller 61 (a lock release part).

First, a description will be given of the lock mechanism 9. The lock arm 20A is mounted turnably on the spindle 27 provided upright in the chassis 10. The spindle 27 includes a torsion spring (not shown) that provides the lock arm 20A with a rotational force in the counterclockwise direction of the FIG. 7.

The lock arm 20A includes the lock claw 24 and the connection part 25 formed integrally with each other. The lock claw 24 engages the lock pin 23 provided in the tray 2. The connection part 25 is connected to the drive pin 21a of the solenoid 21. The drive pin 21a is moved in the X1 direction by exciting the solenoid 21.

Therefore, by moving the drive pin 21a by exciting the solenoid 21, the lock arm 20A is turned on the spindle 27 in the clockwise direction of FIG. 7. As shown in FIG. 11, the solenoid 21 is connected to the system controller 61 so that the system controller 61 controls the excitation of the solenoid 21.

When the tray 2 is moved in the X2 direction to the housed position, the lock claw 24 of the lock arm 20 engages the lock pin 23 to set a lock on the movement of the tray 2. This prevents the tray 2 from being ejected from the chassis 10 at a time of data reproduction from the disk 3, thus protecting the disk 3 and preventing the devices forming the disk unit 1A from being damaged. FIG. 8A shows a state in which the tray 2 is locked by the lock mechanism 9 during reproduction.

Next, a description will be given of the lock release mechanism.

The eject rod 22A, which extends in the X1 and X2 directions in the tray 2 as previously described, is made of such a material as to let light through, such as an acrylic resin. The eject rod 22A includes the operation and light-emitting part 30, the light-receiving part 31, the spring-hooking part 32, the engaging convex part 33, and an end part 28 that are formed integrally with one another.

The eject rod 22A of the above-described structure is guided by a guide (not shown) provided in the tray 2 to be movable in the X1 and X2 directions. A coil spring 36 is provided between the spring-hooking part 32 and a spring-hooking pin 37 provided upright in the tray 2. The coil spring 36 always provides the eject rod 22A with a force in the X1 direction.

However, the engaging convex part 33 formed on the eject rod 22A engages the boss 38 formed in the tray 2, thereby preventing the eject rod 22A form being moved further in the X1 direction. In this state, the operation and light-emitting part 30 formed on the X1 end part of the eject rod 22A protrudes to some extent from the hole 11b formed in the front bezel 11.

Therefore, when the operator presses the operation and light-emitting part 30, the eject rod 22A is moved in the X2 direction against the elastic force of the coil spring 36. The amount of protrusion of the operation and light-emitting part 30 from the hole 11b is set to be smaller than the amount of protrusion of the convex part 11a, thus preventing an unintentional operation of the operation and light-emitting part 30.

The light-receiving part 31 is mirror-finished and is formed on the side of the eject rod 22A. The light-receiving part 31 opposes the LED 40 provided on the printed board 13 when the tray 2 is in the housed position shown in FIG. 8A. Therefore, when the LED 40 opposes the light-receiving part 31 and is turned on, the LED 40 emits light to the light-receiving part 31.

When the light emitted from the LED 40 is incident on the light-receiving part 31, the light is introduced into the eject rod 22A to travel in the X1 direction inside the eject rod 22A. Therefore, the operator is allowed to see the light emitted from the LED 40 from the operation and light-emitting part 30. Further, the LED 40 lights up when data is reproduced from the disk 3. Therefore, the operator can determine, based on the presence or absence of light from the operation and light-emitting part 30, whether the data is reproduced from the disk 3.

As described above, by providing the LED 40 on the printed board 13 included in the chassis 10, the number of interconnection lines electrically connecting the chassis 10 and the tray 2 can be reduced, thereby reducing the number of the interconnection lines of the FPC 15.

Further, a driving circuit for driving the LED 40 is provided on the printed board 13. Therefore, by providing the LED 40 on the printed board 13 including the driving circuit, there is no more need to consider the attenuation of an LED driving current, thus improving the luminous efficacy of the LED 40 and reducing current consumption in the recording medium loading device.

Figure 1:
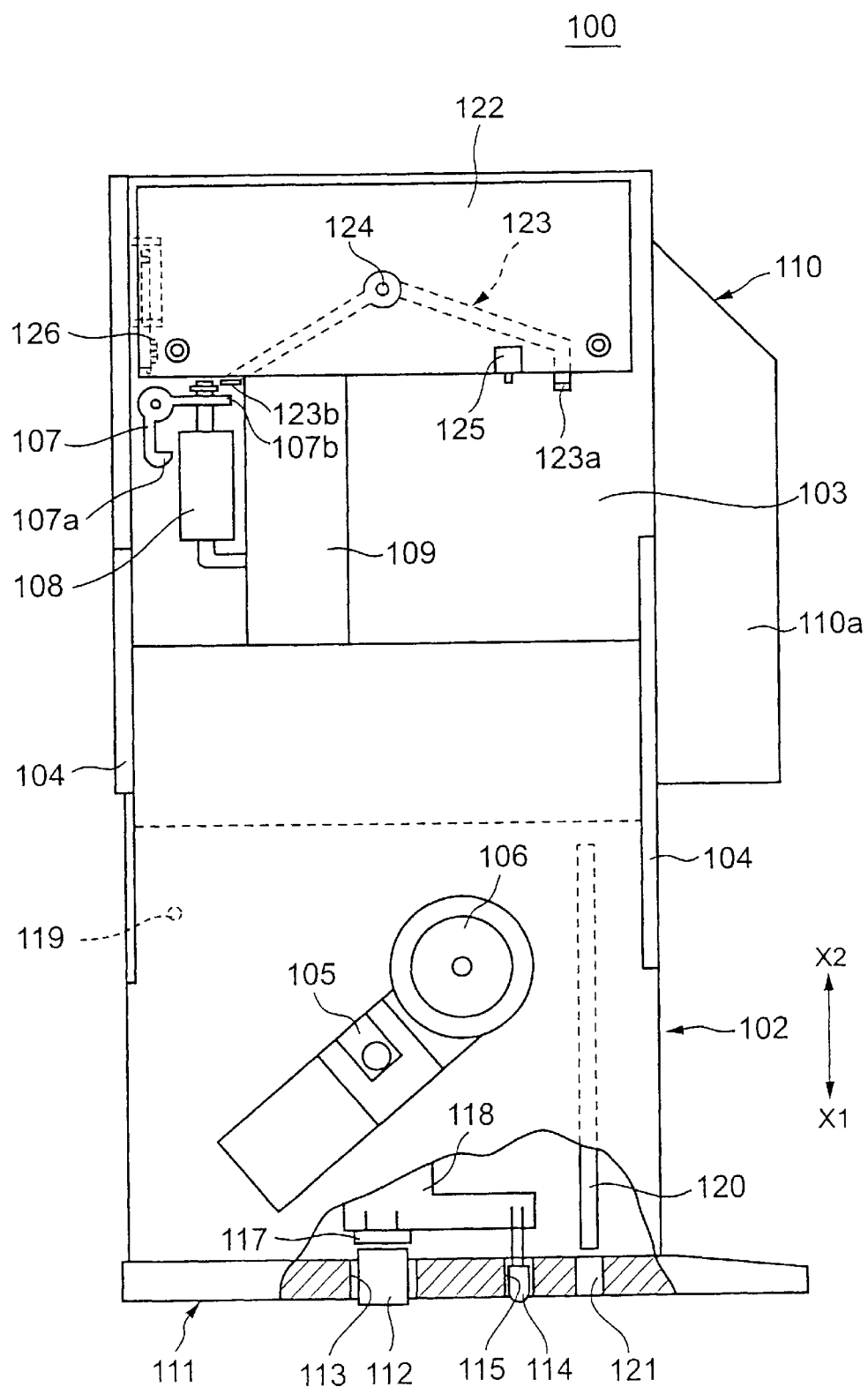
FIG. 1 is a diagram showing a disk unit including a conventional recording medium loading device.

As previously described, in the conventional disk unit 100, where the LED 114 is provided in the front bezel 111, static electrical discharge is generated between the operator and the LED 114, which may lead to the breakage of the electronic components provided in the disk unit 100 (see FIG. 1). However, according to the disk unit 1A of this embodiment, the LED 40 is provided in the chassis 10 so that there is a considerable distance between the LED 40 and a position where the operator operates the eject rod 22A (that is, the operation and light-emitting part 30).

This prevents static electrical discharge from being generated between the LED 40 and the operator, thus preventing electronic components provided in the disk unit 1A from suffering damage resulting from static electricity.

Further, the tray switch 41 and the eject switch 42, together with the LED 40, are arranged in the X1–X2 direction on the Y2 side edge of the printed board 13. The tray switch 41 and the eject switch 42 are so-called normally off ON/OFF switches, and are connected to the system controller 61 as previously described (see FIG. 11). Further, the tray switch 41 and the eject switch 42 engage the end part 28 of the eject rod 22A provided in the tray 2 as the tray 2 is moved.

Specifically, with the tray 2 being locked in the housed position as shown in FIG. 8A, the end part 28 of the eject rod 22A provided in the tray 2 engages and operates the tray switch 41 as shown enlarged in FIG. 8C.

That is, when the tray 2 is in the housed position and the lock mechanism 9 locks the tray 2, the tray switch 41 is switched ON (ON state). However, in this housed state, the eject switch 42 does not engage the eject rod 22A and is switched OFF (OFF state).

The system controller 61, by detecting ON state of the tray switch 41, recognizes that the tray 2 is in the housed position and is locked by the lock mechanism 9.

On the other hand, in order to eject the tray 2 from the chassis 10 in the housed state shown in FIG. 8A, the operator presses the eject rod 22A in the X2 direction. As described above, the tray 2 is fixed to the chassis 10 by the lock mechanism 9 in the housed state, but the eject rod 22A is movable with respect to the tray 2. Therefore, by the operator pressing the operation and light-emitting part 30, the eject rod 22A is moved in the X2 direction.

Figure 9A:
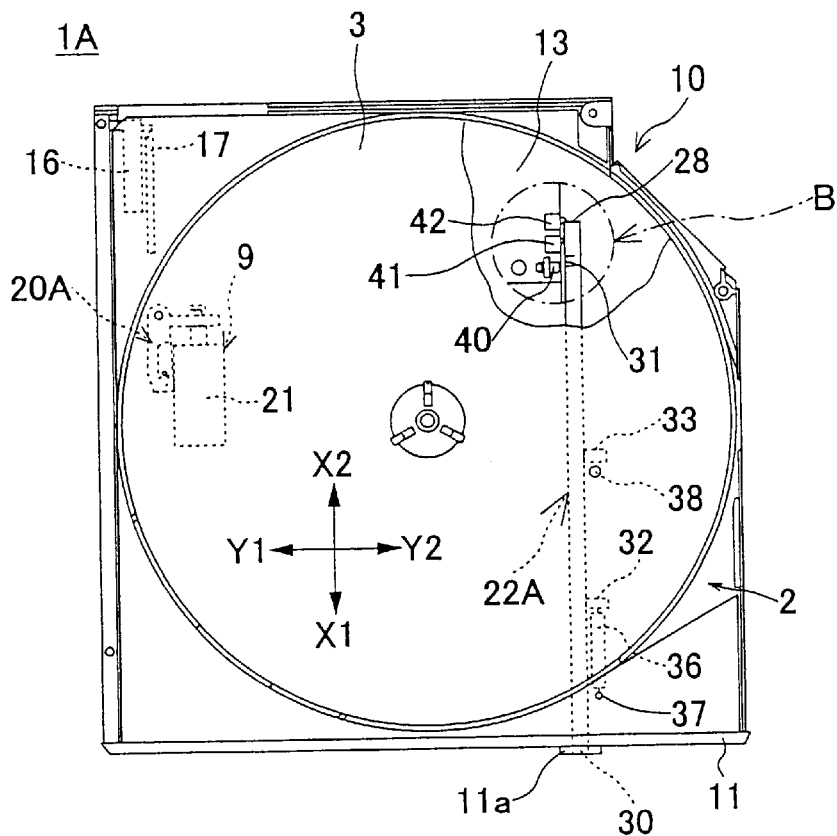
FIG. 9A is a top plan view of the disk unit with an eject rod being operated.
Figure 9B:
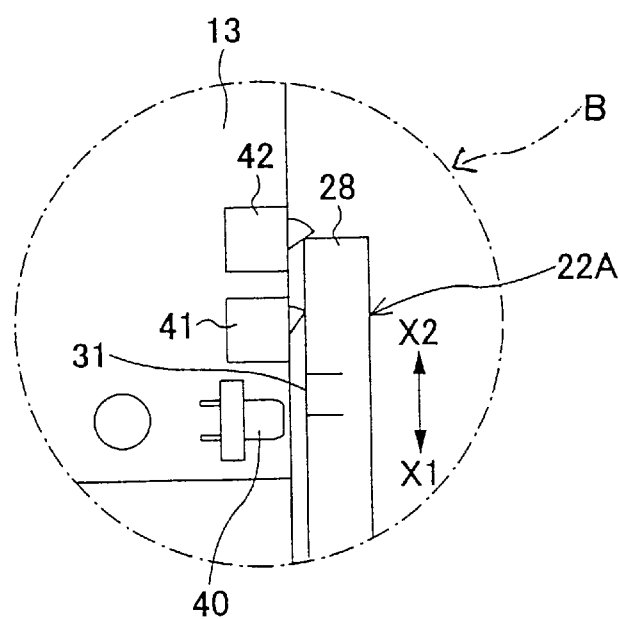
FIG. 9B is an enlarged view of a part of the disk unit indicated by arrow B in FIG. 9A.

FIG. 9A shows an eject operation state in which the eject rod 22A is moved in the X2 direction. FIG. 9B is an enlarged view of a part of the disk unit 1A indicated by arrow B in FIG. 9A. As shown enlarged in FIG. 9B, in the eject operation state, the end part 28 of the eject rod 22A engages the eject switch 42. Thereby, the eject switch 42 is switched ON (ON state). At this point, as shown in FIG. 9B, the eject rod 22A maintains the tray switch 41 in ON state.

By sensing that both tray switch 41 and eject switch 42 are in ON state, the system controller 61 recognizes that the operator has given an eject instruction to eject the tray 2. The ejected state of the tray 2 shown in FIG. 7 and a state thereof during ejection shown in 10A are detectable by OFF state of the eject switch 42.

Next, a description will be given of the operations of the lock mechanism 9 and the lock release mechanism.

First, a description will be given of an operation of moving the tray 2 from the ejected state shown in FIG. 7 and the housed state shown in FIG. 8A. In order to move the tray 2 to the housed state, the operator holds the front bezel 11 and moves the tray 2 in the X2 direction.

Thereby, the tray 2 is moved in the X2 direction, being guided by the guide rail mechanism 4. At this point, the eject rod 22A is pressed in the X1 direction by the resilient force of the coil spring 36, but is prevented from moving further by the engaging convex part 33 contacting the boss 38. In this state, the operation and light-emitting part 30 protrudes to some extent from the front bezel 11.

When the tray 2 is moved up to the housed position, as shown in FIG. 8A, the lock pin 23 provided in the tray 2 engages the lock claw 24 of the lock arm 20A forming the lock mechanism 9. Specifically, with the movement of the tray 2, the lock pin 23 engages the lock claw 24 of the lock arm 20A and moves the lock arm 20A in the clockwise direction.

As previously described, the lock arm 20A includes the torsion spring that is not shown in the drawings. Therefore, when the tray 2 is moved in the X2 direction so that the lock pin 23A is moved up to a position inside the lock claw 24, the lock arm 20A is moved in the counterclockwise direction by the pressing force of the torsion spring so that the lock pin 23 engages the lock claw 24.

In this state, the tray 2 is locked to the chassis 10 by the lock mechanism 9 so as to be prevented from being moved in the X1 direction.

With the tray 2 being moved to the housed position, the eject rod 2A provided in the tray 2 is also moved in the X2 direction together with the tray 2. When the tray 2 is moved up to the housed position, the end part 28 of the eject rod 22A operates the tray switch 41 as shown in FIG. 8C. Thereby, the system controller 61 senses that the tray 2 is in the housed state.

At this point, the engaging convex part 33 formed on the eject rod 22A contacts the boss 38 provided in the tray 2.

This prevents the eject rod 22A from being moved in the X1 direction (with respect to the tray 2) when the end part 28 operates the tray switch 41, thereby ensuring detection of the housed state of the tray 2.

Further, in the above-described housed state, the light-receiving part 31 opposes the LED 40. Therefore, when the LED 40 is turned on, the light emitted from the LED 40 enters the eject rod 22A from the light-receiving part 31 as previously described, and travels inside the eject rod 22A so that the lighting of the LED 40 can be visually recognized from the operating and light-emitting part 30.

In the above-described housed state, the disk unit 1A performs data reproduction from the disk 3 placed on the tray 2. Since the operation and light-emitting part 30 emits light when the data reproduction is performed, the operator can recognize that the disk unit 1A is in a data reproduction state by the light emitted from the operation and light-emitting part 30.

Next, a description will be given of an operation of pulling out from the chassis 10 the tray 2 in the housed state shown in FIG. 8A (an eject operation).

In order to eject the tray 2 from the chassis 10, the operator presses, in the X2 direction, the operation and light-emitting part 30 protruding from the front bezel 11. Thereby, the eject rod 22A is moved in the X2 direction against the elastic force of the coil spring 36 so that the end part 28 of the eject rod 22A presses the eject switch 42 as shown in FIGS. 9A and 9B.

When both tray switch 41 and eject switch 42 are switched ON (ON state), the system controller 61 actuates a solenoid-actuating transistor 62 to energize the solenoid 21. Thereby, the solenoid is excited so that the drive pin 21a is pulled in in the X1 direction as shown in FIG. 10A.

When the drive pin 21a is pulled in, the lock arm 20A is turned on the spindle 27 in the clockwise direction. In accordance with this turning, the lock claw 24 is moved away from the lock pin 23. Thereby, the lock set on the tray 2 by the lock mechanism 9 is released and the tray 2 is set movable in the X1 direction (toward the ejected position).

In the housed state, with tray 2 pressing the eject slider 16, the coil spring 17 is stretched to store elastic force. Therefore, by releasing the lock set by the lock mechanism 9, the eject slider 16 connected to the coil spring 17 moves the tray 2 in the X1 direction.

Figure 10A:
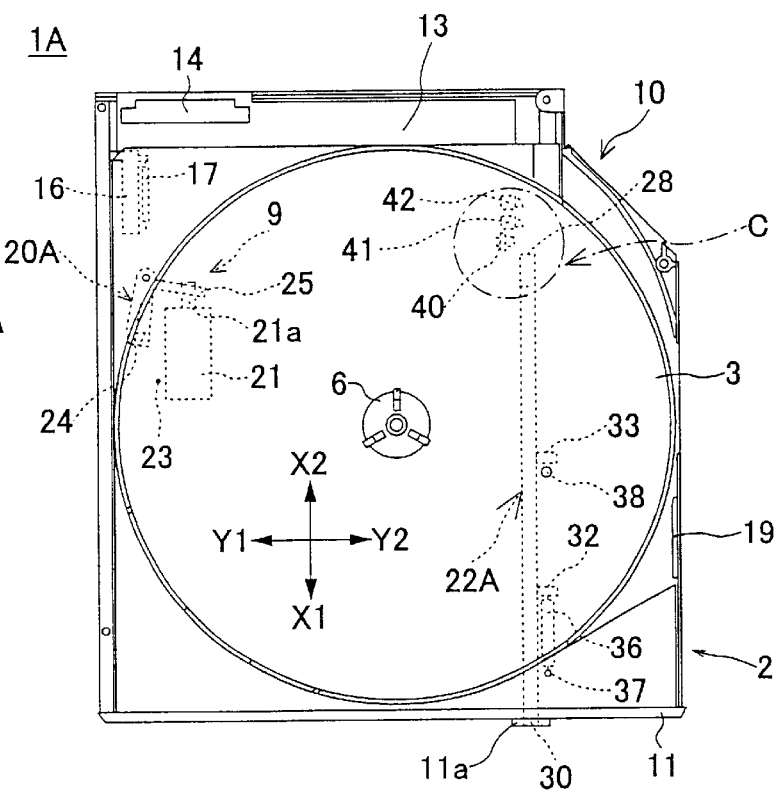
FIG. 10A is a top plan view of the disk unit in a state where the tray is being ejected.
Figure 10B:
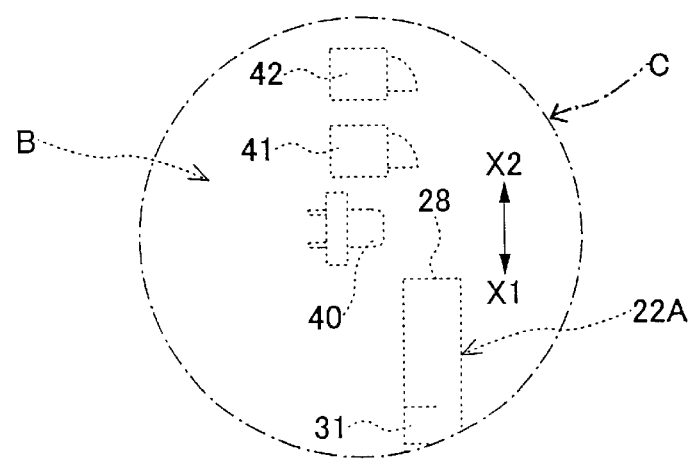
FIG. 10B is an enlarged view of a part of the disk unit indicated by arrow C in FIG. 10A.

Thereby, a part of the tray 2 on the side of the front bezel 11 protrudes from the chassis 10 (FIG. 10A shows this state). The operator holds the part of the tray 2 protruding from the chassis 10 and pulls out the tray 2 up to the ejected position. Thus, the tray 2 is moved up to the ejected position.

As previously described, according to the structure of this embodiment, the lock set on the tray 2 in the housed position by the lock mechanism 9 can be released by operating the eject rod 22 forming the lock release mechanism. Therefore, it is no longer necessary to provide the conventional electric eject switch 117 shown in FIG. 1 in the tray 2.

Thereby, the resistance of the recording medium loading device to static electricity is increased so that static electrical discharge is reliably prevented from occurring between the operator and electronic components. Therefore, the electronic components provided in the disk unit 1A are reliably prevented from being damaged by the static electrical discharge.

Further, by dispensing with the electric eject switch 117, the recording medium loading device can reduce the number of its components and individual defects of wiring parts, thereby increasing the reliability of the recording medium loading device. Moreover, the number of the interconnection lines of the FPC 15 can be reduced so that the production costs of the FPC 15 can be decreased.

Next, a description will be given of a third embodiment of the present invention.

FIGS. 12 through 16 are diagrams for illustrating a structure and an operation of a disk unit 1B including a recording medium loading device according to the third embodiment of the present invention. In FIGS. 12 through 16, the same elements as those described in FIGS. 7 through 11 are referred to by the same numerals, and a description thereof will be omitted.

The above-described recording medium loading device according to the second embodiment of the present invention employs the two separate switches of the tray switch 41 and the eject switch 42 to sense that the tray 2 is housed in the housed position in the chassis 10 and that the operator operates the eject rod 22A.

On the other hand, according to this embodiment, one tray/eject switch 43 is employed to sense that the tray 2 is housed in the housed position in the chassis 10 and that the operator operates the eject rod 22A.

Like the tray switch 41 and the eject switch 42 of the second embodiment, the tray/eject switch 43 is provided on the printed board 13. The tray/eject switch 43 is defined by a main body part 43A and an arm part 43B.

The arm part 43B is movable to three positions with respect to the main body part 43A and can generate an output signal in each of the three positions. That is, the tray/eject switch employs a three-position detection switch.

Figure 13A:
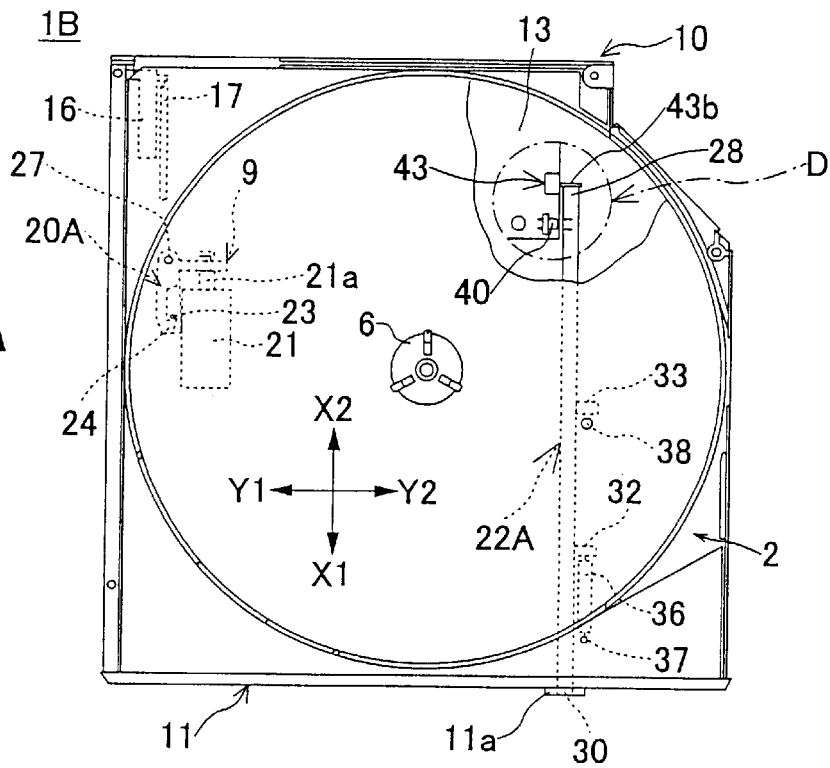
FIGS. 13A and 13B are a top plan view and a front view of the disk unit with the tray being in a housed position, respectively.
Figure 13B:
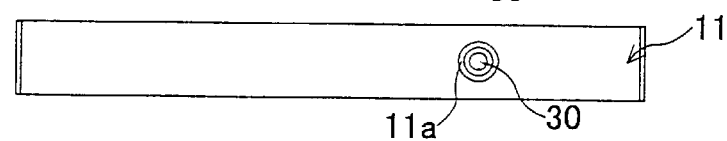
Figure 13C:
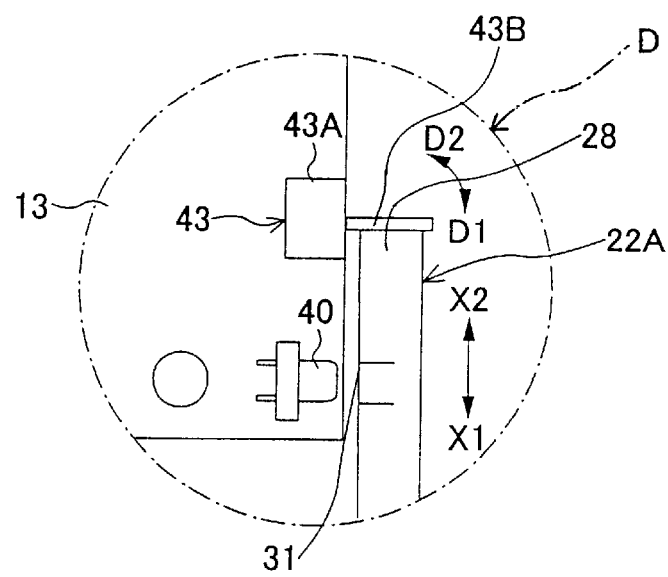
FIG. 13C is an enlarged view of a part of the disk unit indicated by arrow D in FIG. 13A.
Figure 14A:
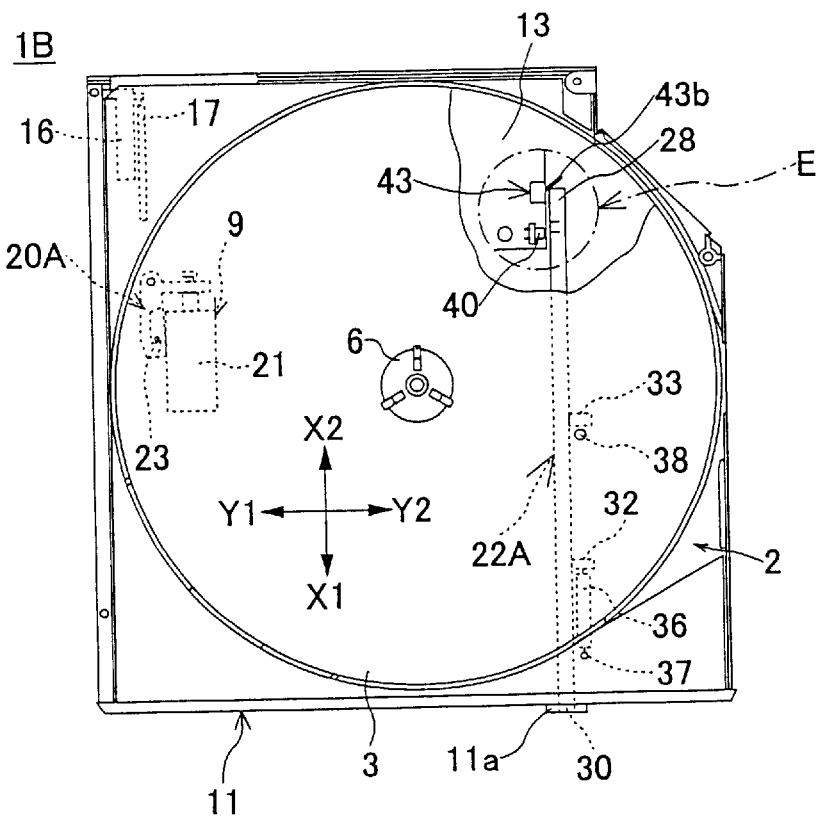
FIG. 14A is a top plan view of the disk unit with an eject rod being operated.
Figure 14B:
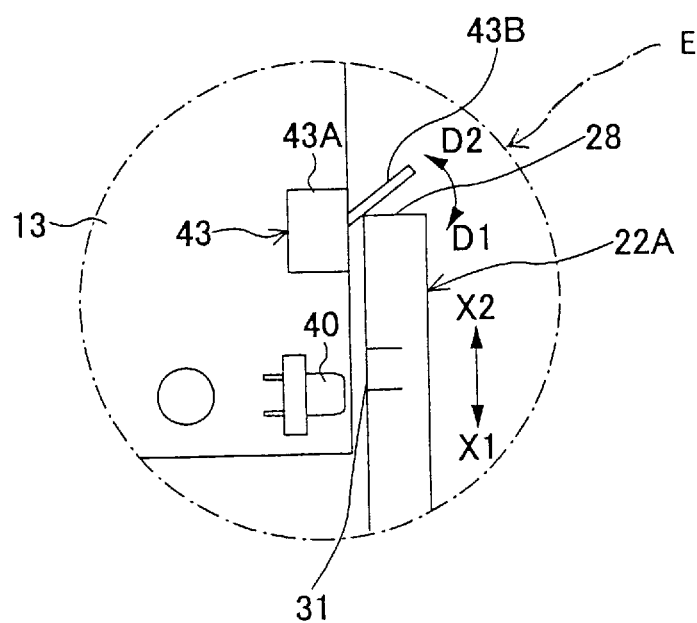
FIG. 14B is an enlarged view of a part of the disk unit indicated by arrow E in FIG. 14A.
Figure 15A:
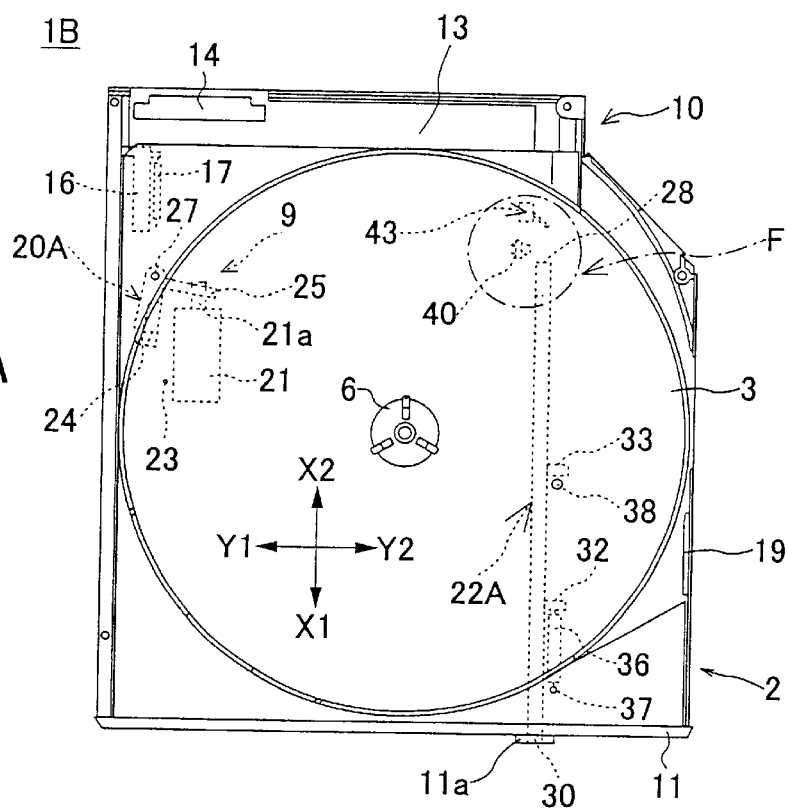
FIG. 15A is a top plan view of the disk unit in a state where the tray is being ejected.
Figure 15B:
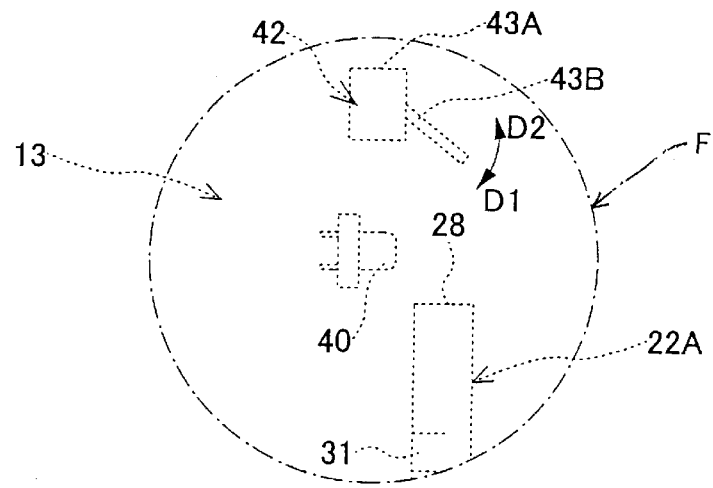
FIG. 15B is an enlarged view of a part of the disk unit indicated by arrow F in FIG. 15A.

Further, the arm part 43B is movable in directions indicated by arrows D1 and D2 (D1 and D2 directions, respectively) in each of FIGS. 13C, 14B, and 15B, and is always pressed in the D1 direction by a spring included in the main body part 43A.

Figure 16:
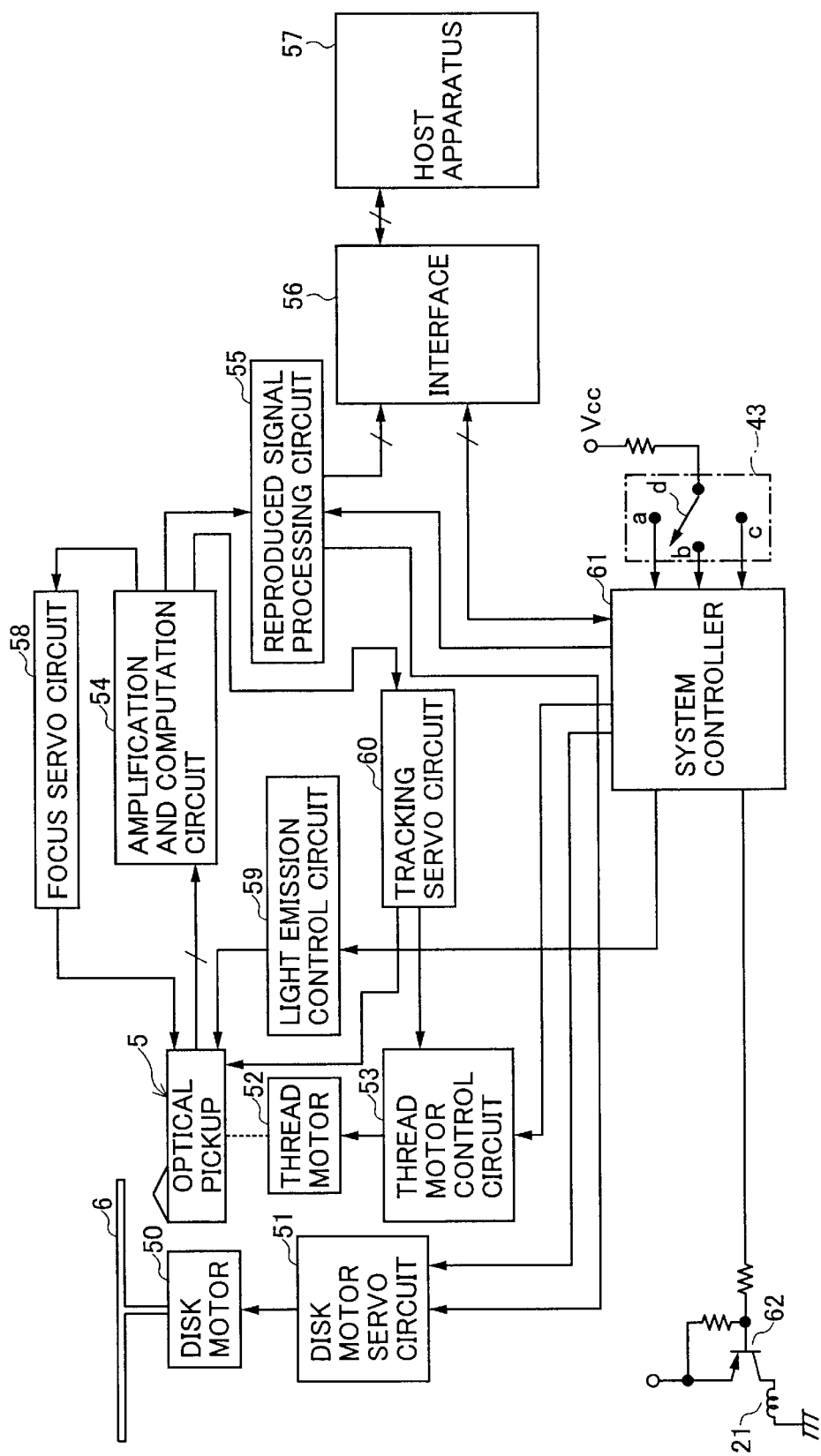
FIG. 16 is a block diagram showing a circuit structure of the disk unit.

A description will be given, with reference to FIG. 16, of an internal structure of the tray/eject switch 43. As shown in FIG. 16, the tray/eject switch 43 includes three terminals a through c in the main body part 43A, and one of the terminals a through c is selectively connected to a connection terminal d with the movement of the arm part 43B. The terminals a through c are connected to the system controller 61 as shown in FIG. 16.

Figure 12:
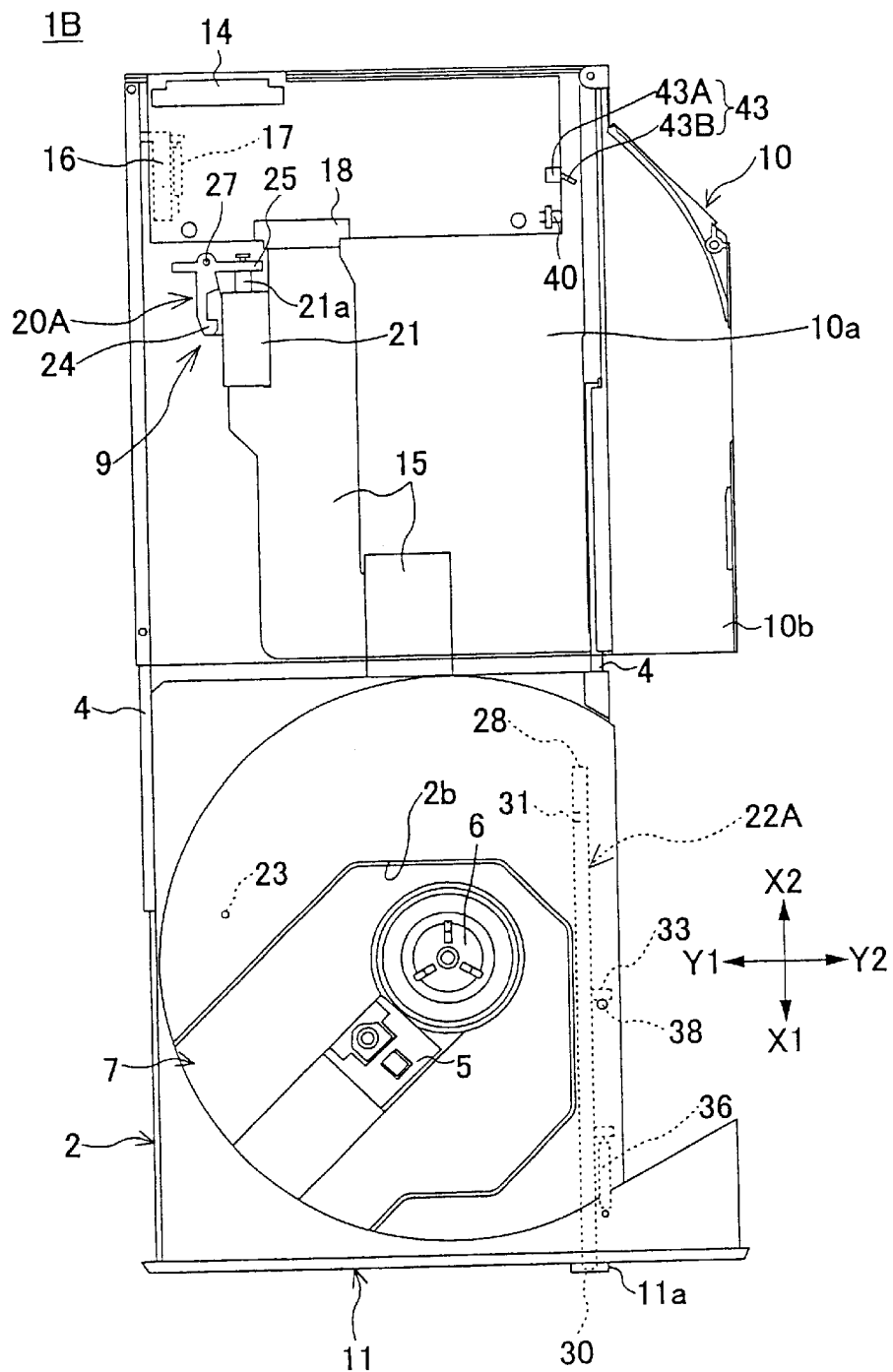
FIG. 12 is a diagram showing a disk unit including a recording medium loading device according to a third embodiment of the present invention with a tray being in an ejected position.

In a state where the connection terminal d is connected to the terminal a, the arm part 43B is moved in the D1 direction to the maximum as shown in FIGS. 12, 15A, and 15B. In this state, the arm part 43B is separated from the eject rod 22A.

This state where the arm part 43B is separated from the eject rod 22A is the ejected state where the tray 2 is ejected from the chassis 10. Therefore, by the connection of the connection terminal d with the terminal a, the system controller 61 can sense that the tray 2 is in the ejected state.

Further, in a state where the connection terminal d is connected to the terminal b, the arm part 43B is substantially at a right angle to a moving direction of the tray 2 as shown in FIGS. 13A and 13B. At this point, the arm part 43B engages the eject rod 22A provided in the tray 2 to be moved in the D2 direction from the states shown in FIGS. 12 and 15A.

This state is the housed state where the tray 2 is moved in the X2 direction to be locked by the lock mechanism 9. Therefore, by the connection of the connection terminal d with the terminal b, the system controller 61 can sense that the tray 2 is in the housed state.

Further, in a state where the connection terminal d is connected to the terminal c, the arm part 43B is moved in the X2 direction by the eject rod 22A as shown in FIGS. 14A and 14B. Thereby, the arm part 43B is moved further in the X2 direction from the state shown in FIGS. 13A and 13B.

In this state, the operator operates the eject rod 22A to eject the tray 2. Therefore, by the connection of the connection terminal d with the terminal c, the system controller 61 can sense that the operator performs an eject operation.

Next, a description will be given of operations of the lock mechanism 9 and the lock release mechanism of this embodiment.

Also in this embodiment, in order to move the tray 2 from the ejected position shown in FIG. 12 to the housed position, the operator holds the front bezel 11 and moves the tray 2 in the X2 direction. When the tray 2 is moved up to the housed position, as shown in FIG. 13A, the lock pin 23 provided in the tray 2 engages the lock claw 24 of the lock arm 20A forming the lock mechanism 9. Thereby, the tray 2 is locked to the chassis 10 by the lock mechanism 9 to be prevented from being moved in the X1 direction.

On the other hand, with the tray 2 being moved to the housed position, the eject rod 22A is also moved in the X2 direction together with the tray 2 so that the end part 28 of the eject rod 22A engages the arm part 43B of the tray/eject switch 43. By the time the tray 2 is moved up to the housed position, the arm part 43B is moved up to a position where the arm part 43B is substantially at a right angle to the moving direction of the tray 2.

Thereby, a terminal connected to the connection terminal d is switched from the terminal a to the terminal b in the tray/eject switch 43 so that the system controller 61 senses that the tray 2 is in the housed state.

At this point, as previously described, the engaging convex part 33 formed on the eject rod 22A contacts the boss 38 formed in the tray 2. Thereby, the arm part 43B is securely operated with the movement of the eject rod 22A, thus ensuring detection of the housed state of the tray 2. In the above-described housed state, the light-receiving part 31 opposes the LED 40 so that the lighting of the LED 40 is visually recognizable from the operation and light-emitting part 30 as in the second embodiment.

Next, a description will be given of an operation (an eject operation) of pulling out from the chassis 10 the tray 2 in the housed state shown in FIG. 13A. In order to pull out the tray 2 from the chassis 10, as in the second embodiment, the operator presses, in the X2 direction, the operation and light-emitting part 30 protruding from the front bezel 11.

By this operation, the eject rod 22A is moved in the X2 direction against the elastic force of the coil spring 36 so that the end part 28 of the eject rod 22A presses the arm part 43B of the tray/eject switch 43 as shown in FIG. 14A and in detail in FIG. 14B. Thereby, a terminal connected to the connection terminal d is switched from the terminal b to the terminal c in the tray/eject switch 43 so that the system controller 61 senses that the operator performs the eject operation.

When the system controller 61 senses from the tray/eject switch 43 that the eject operation is performed, the system controller 61 actuates the solenoid-driving transistor 62 to energize the solenoid 21. Thereby, the lock mechanism performs the same operation as in the second embodiment to release the lock set on the tray 2 by the lock mechanism 9, setting the tray 2 movable in the X1 direction (toward the ejected position).

Further, the coil spring 17 causes the part of the tray 2 on the side of the front bezel 11 to protrude from the chassis 10

(see FIG. 15A). The operator holds the part of the tray 2 protruding from the chassis 10 and pulls out the tray 2 up to the ejected position, thereby moving the tray 2 up to the ejected position.

As described above, the electric eject switch 117 is not provided in the tray 2 in this embodiment, either, as in the above-described second embodiment.

Thereby, the resistance of the recording medium loading device to static electricity is increased so that static electrical discharge is reliably prevented from occurring between the operator and electronic components. Therefore, the electronic components are reliably prevented from being damaged by the static electrical discharge. Further, by dispensing with the electric eject switch 117, the recording medium loading device can reduce the number of its components and individual defects of wiring parts, and the production costs of the FPC 15 can be decreased.

In the second embodiment, the two switches of the tray switch 41 and the eject switch 42 are provided so that the two switches separately serve to sense the ejection and housing of the tray 2, and the eject operation. On the other hand, in this embodiment, the single tray/eject switch 43 serve to sense both the ejection and housing of the tray 2, and the eject operation, thereby reducing the number of components and the production costs of the recording medium loading device compared with the second embodiment.

Next, a description will be given of a fourth embodiment of the present invention.

FIGS. 17 through 23 are diagrams for illustrating a structure and an operation of a disk unit 1C including a recording medium loading device according to the fourth embodiment of the present invention. In FIGS. 17 through 23, the same elements as those described in FIGS. 7 through 11 are referred to by the same numerals, and a description thereof will be omitted.

The recording medium loading device of this embodiment has an eject rod 22B (an operation member) provided on the Y1 side in the tray 2 in the drawings. Thereby, with the tray 2 being housed in the chassis 10, the eject rod 22B is in close proximity to the lock mechanism 9.

Figure 19A:
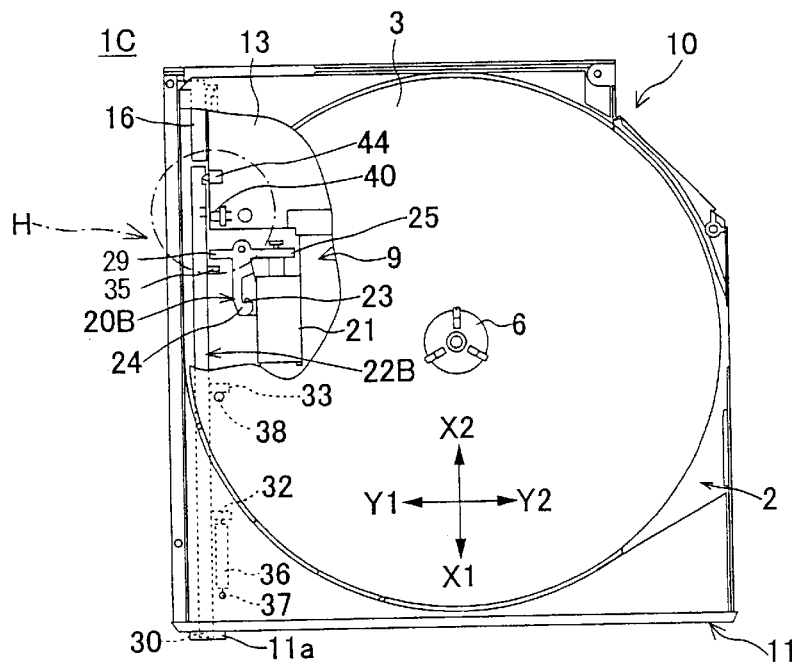
FIG. 19A is a top plan view of the disk unit with an eject rod being operated.
Figure 19B:
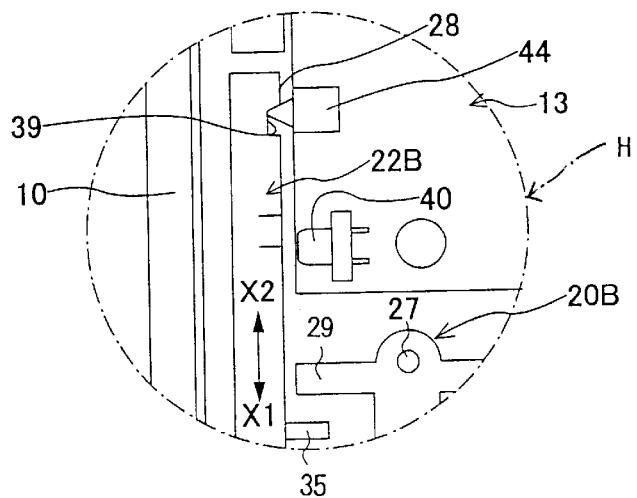
FIG. 19B is an enlarged view of a part of the disk unit indicated by arrow H in FIG. 19A.
Figure 20A:
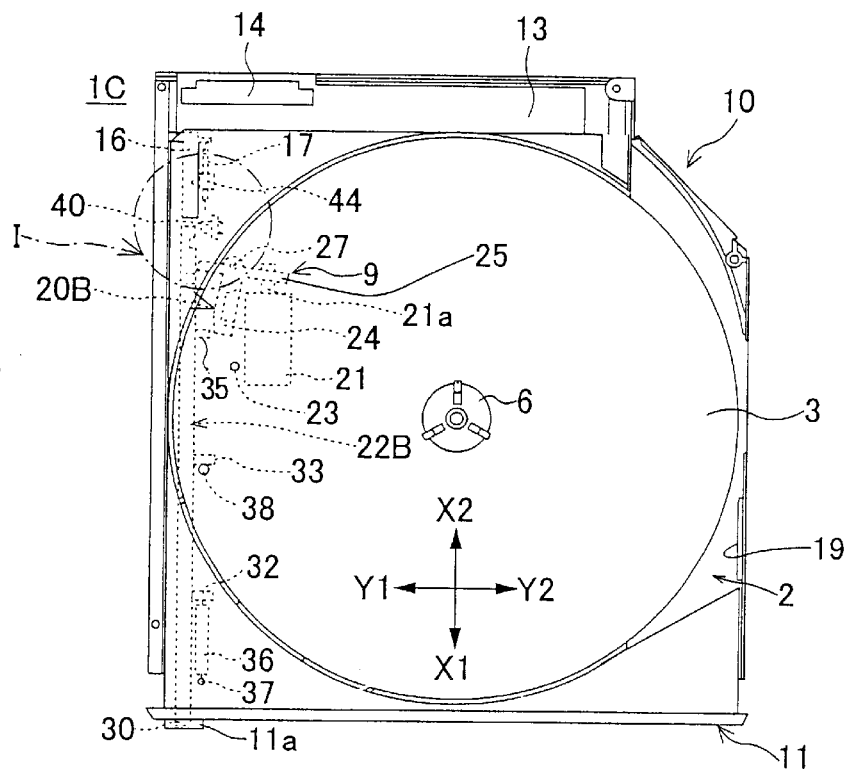
FIG. 20A is a top plan view of the disk unit in a state where the tray is being ejected.
Figure 20B:
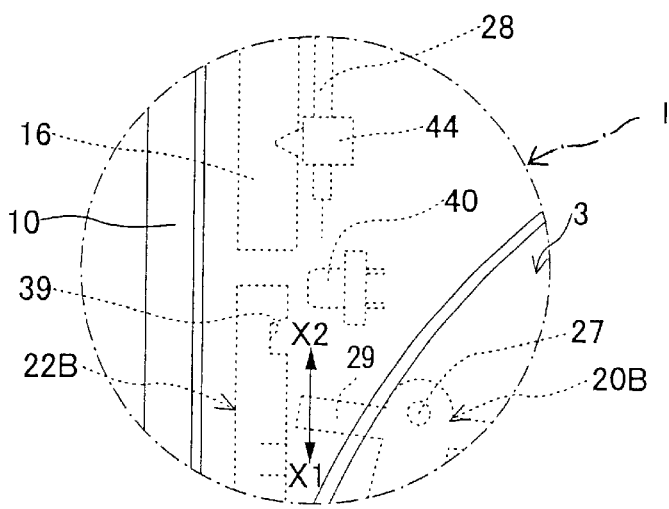
FIG. 20B is an enlarged view of a part of the disk unit indicated by arrow I in FIG. 20A.

Further, a switch-driving concave part 39 (a detected part) is formed in close proximity to the end part 28 in the eject rod 22B (shown in detail in FIGS. 18C, 19B, and 20B). As will be described later, the switch-driving concave part 39 engages a tray/eject switch 44. Further, an emergency convex part 35 is formed between the engaging convex part 33 and the switch-driving concave part 39 on the eject rod 22A so as to protrude in the Y2 direction.

In this embodiment, the lock arm 20B forming the lock mechanism 9 includes a lock release arm 29. As will be described later, this lock release arm 29 engages the emergency convex part 35 formed on the eject rod 22B.

Further, since the eject rod 22B is provided on the Y1 side in the tray 2, the tray/eject switch 44 is provided on the Y1 side on the printed board 13. As will be described later, the single tray/eject switch 44 can detect the ejection and housing of the tray 2 and the eject operation by detecting the switch-driving concave part 39 formed in the eject rod 22B. Therefore, like the tray/eject switch 43 in the third embodiment, the tray/eject switch 44 can contribute to the reduction of the number of components and the production costs of the recording medium loading device compared with the second embodiment.

Next, a description will be given of operations of the lock mechanism 9 and the lock release mechanism of this embodiment.

In this embodiment, the single switch of the tray/eject switch 44 detects the ejection and housing of the tray 2 and the eject operation by detecting the switch-driving concave part 39 formed in the eject rod 22B.

With the movement of the eject rod 22B, the tray/eject switch 44 engages the switch-driving concave part 39 to be in OFF state, and engages other parts of the eject rod 22B than the switch-driving concave part 39 to be in ON state. Further, the tray/eject switch 44 is in OFF state when the tray/eject switch 44 is separated from the eject rod 22B.

Figure 23:
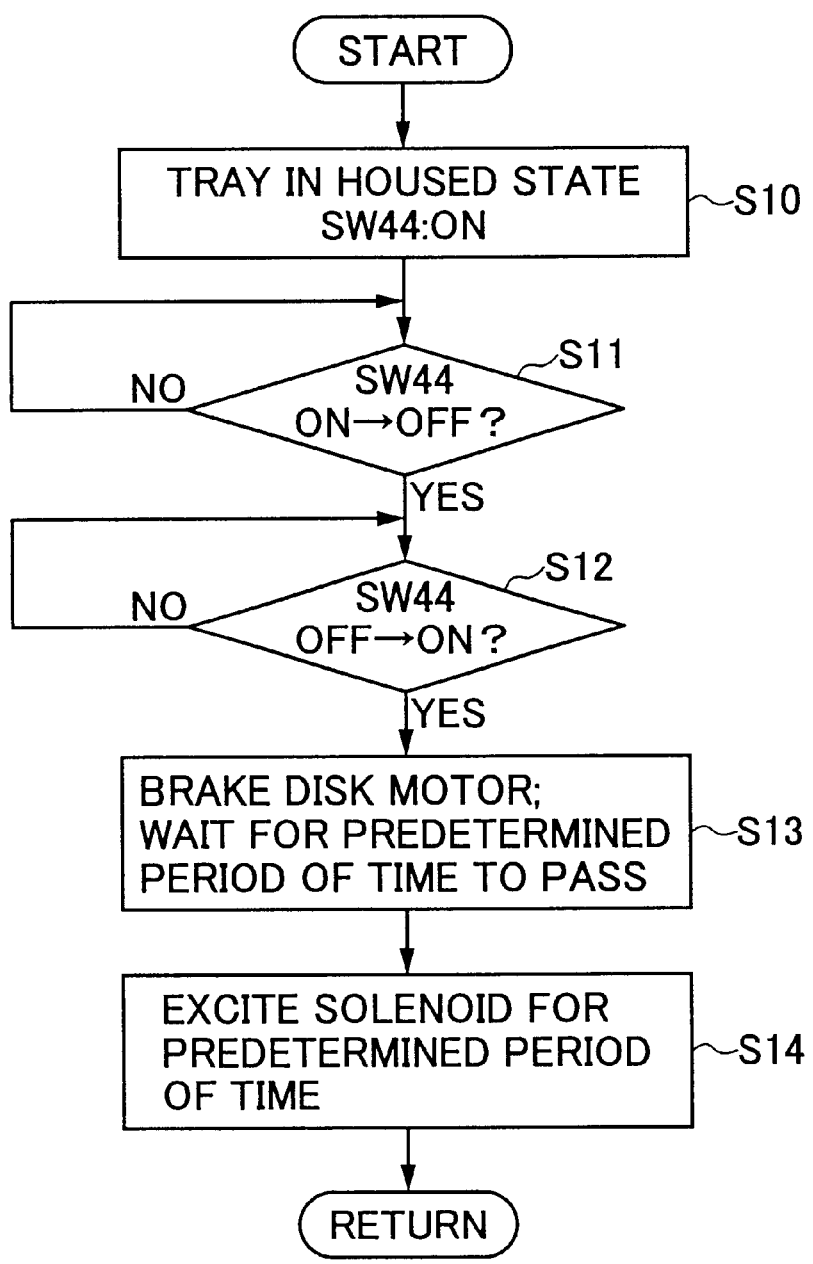
FIG. 23 is a flowchart showing an eject operation of the recording medium loading device.

Therefore, by detecting a change in ON-OFF state (output) of the tray/eject switch 44, the system controller 61 locks or unlocks the tray 2. FIG. 23 is a flowchart of a lock and lock-release operation program performed by the system controller 61 based on the output of the tray/eject switch 44 (abbreviated as SW44 in FIG. 23).

A description will now be given of the specific operation.

Figure 17:
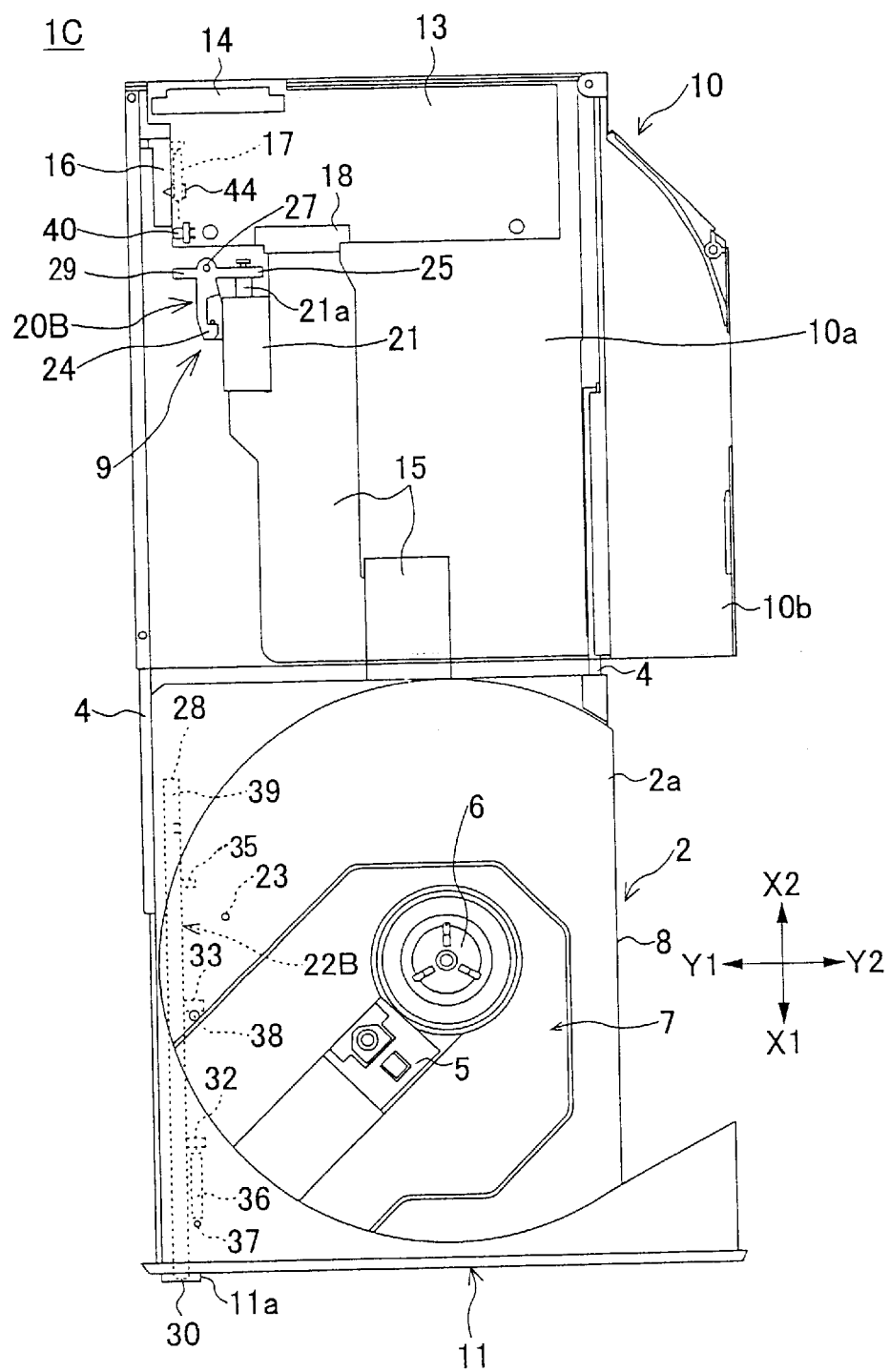
FIG. 17 is a diagram showing a disk unit including a recording medium loading device according to a fourth embodiment of the present invention with a tray being in an ejected position.

In order to move the tray 2 from the ejected position shown in FIG. 17 to the housed position, the operator holds the front bezel 11 and moves the tray 2 in the X2 direction. When the tray 2 is moved up to the housed position, as shown in FIG. 18A, the lock pin 23 provided in the tray 2 engages the lock claw 24 of the lock arm 20B. Thereby, the tray 2 is locked to the chassis 10 by the lock mechanism 9 so as to be prevented from being moved in the X1 direction.

On the other hand, with the tray 2 being moved to the housed position, the eject rod 22B provided in the tray 2 is also moved in the X2 direction together with the tray 2 so that the end part 28 of the eject rod 22B engages the tray/eject switch 44 as shown in detail in FIG. 18C. Thereby, the tray/eject switch 44 changes from OFF state to ON state.

In step S10 of FIG. 23, the system controller 61 senses that the tray 2 is in the housed state by sensing that the tray/eject switch 44 is in ON state. In this housed state, the light-receiving part 31 opposes the LED 40 so that the lighting of the LED 40 is visually recognizable from the operation and light-emitting part 30 as in the second and third embodiments.

Next, a description will be given of an operation (an eject operation) of pulling out from the chassis 10 the tray 2 in the housed state shown in FIG. 18A. In order to pull out the tray 2 from the chassis 10, the operator presses, in the X2 direction, the operation and light-emitting part 30 protruding from the front bezel 11 as in the second and third embodiments.

By this pressing operation, the eject rod 22B is moved in the X2 direction against the elastic force of the coil spring 36. In process of this movement, first, the switch-driving concave part 39 formed in the eject rod 22B engages the tray/eject switch 44 as shown in FIG. 19A and in detail in FIG. 19B.

This changes the tray/eject switch 44 from ON state to OFF state, and this signal change is transmitted to the system controller 61. Therefore, in step S11 of FIG. 23, the system controller 61 decides in the affirmative so that the operation proceeds to step S12.

When the operator stops pressing the operation and light-emitting part 30, the eject rod 22B is moved back in the X1 direction by the resilient force of the coil sprint 36 so that the tray/eject switch 44 is disengaged from the switch-driving concave part 39 to again oppose the sidewall of the end part 28 of the eject rod 22B.

Thereby, the tray/eject switch 44 changes from OFF state to ON state, and this signal change is transmitted to the system controller 61. Therefore, in step S12 of FIG. 23, the system controller 61 decides in the affirmative so that the operation proceeds to step S13.

In step S13, the system controller 61 brakes the disk motor 50 via the disk motor servo circuit 51, and waits for a predetermined period of time to pass. This predetermined period is a time required for the turntable 6 to decelerate.

Next, in step S14, the system controller 61 actuates the solenoid-driving transistor 62 to energize the solenoid 21 for a predetermined period of time. Thereby, the same operation as in the second and third embodiments is performed in the lock mechanism 9 so that the lock set on the tray 2 by the lock mechanism 9 is released, setting the tray 2 movable in the X1 direction (toward the ejected position).

The tray 2 pops out from the chassis 10 by means of the above-described resilient force of the coil spring 17 (see FIG. 20A). The operator holds the popping part of the tray 2 and pulls out the tray 2 up to the ejected position. Thereby, the tray 2 is moved up to the ejected position.

As described above, also in this embodiment as in the second and third embodiments, the resistance of the recording medium loading device to static electricity is increased so that static electrical discharge is reliably prevented from occurring between the operator and electronic components. Therefore, the electronic components are reliably prevented from being damaged by the static electrical discharge.

Further, the recording medium loading device can reduce the number of its components and individual defects of wiring parts, and the production costs of the FPC 15 can be decreased.

In this embodiment, as in the third embodiment, the single tray/eject switch 44 can detect the ejection and housing of the tray 2 and the eject operation, thereby reducing the number of components and the production costs of the recording medium loading device.

Figure 22:
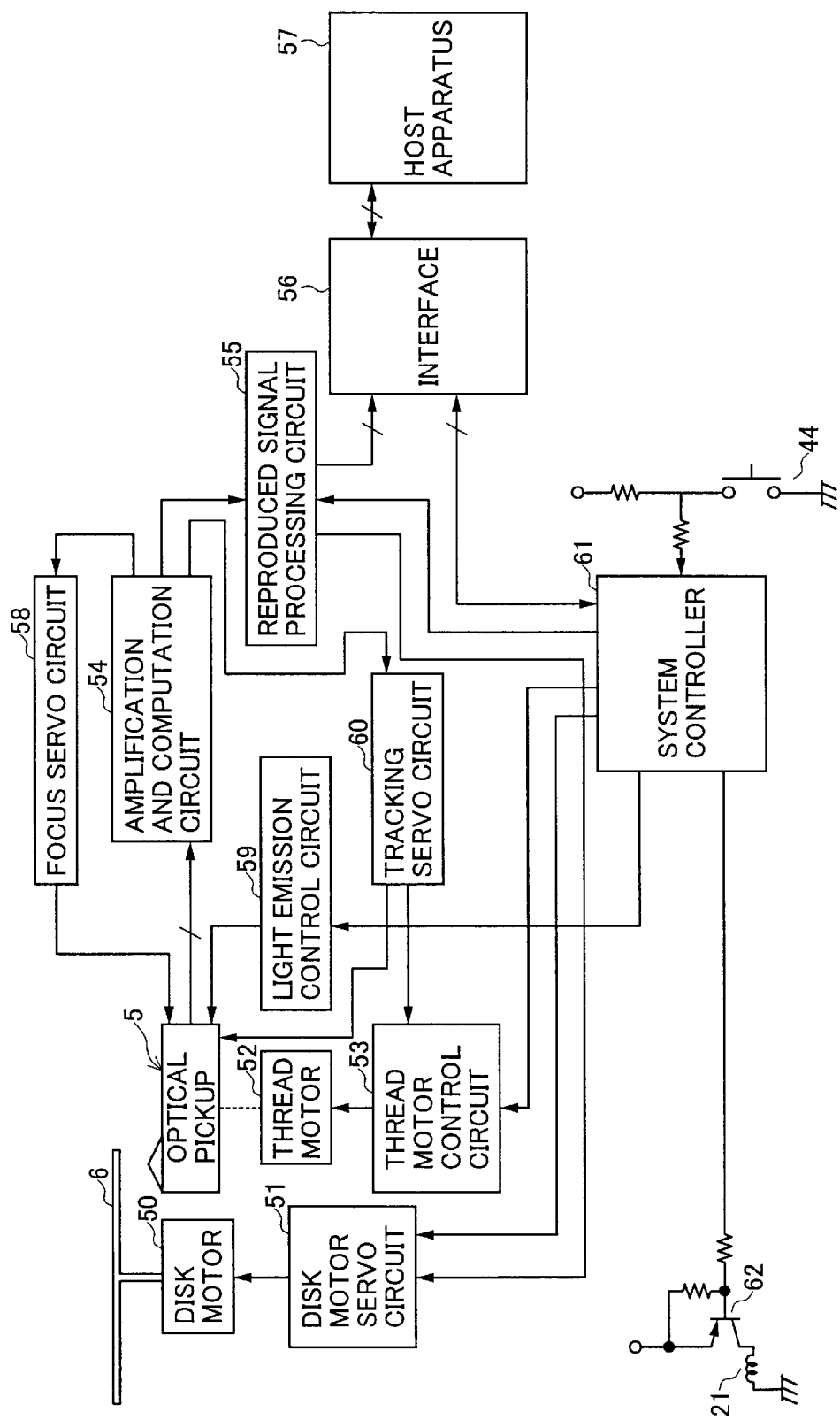
FIG. 22 is a diagram showing a circuit structure of the disk unit.

Further, the tray/eject switch 44 employed in this embodiment is a normal ON-OFF switch (a two-state detection switch) as shown in FIG. 22, and has a simpler structure and is less costly than the three-state (position)-detectable tray/eject switch 43 employed in the third embodiment shown in FIG. 16. Therefore, according to this embodiment, further cost reduction can be achieved than in the third embodiment.

Next, a description will be given of an emergency operation in this embodiment.

Figure 21A:
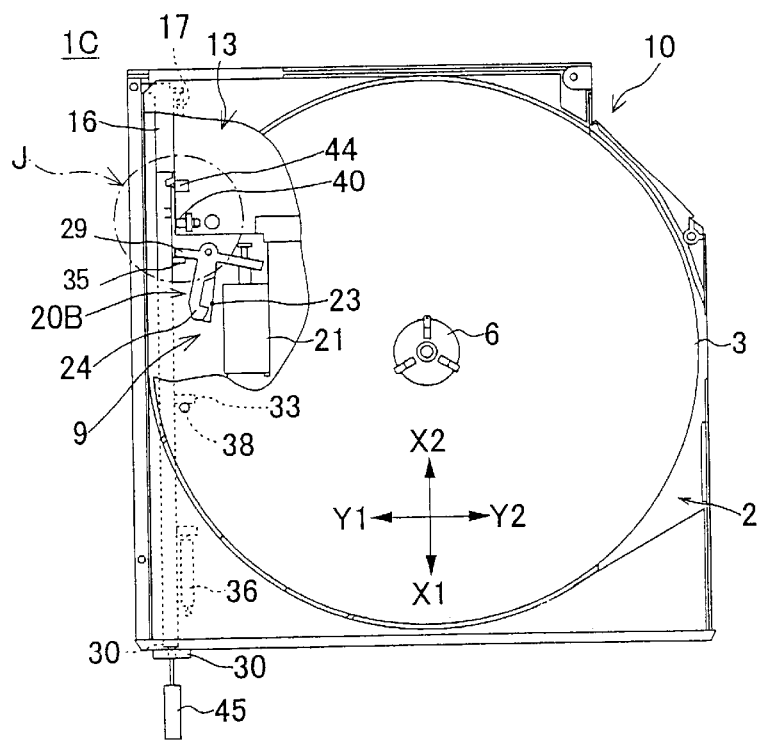
FIG. 21A is a top plan view of the disk unit for illustrating an operation in an emergency state.
Figure 21B:
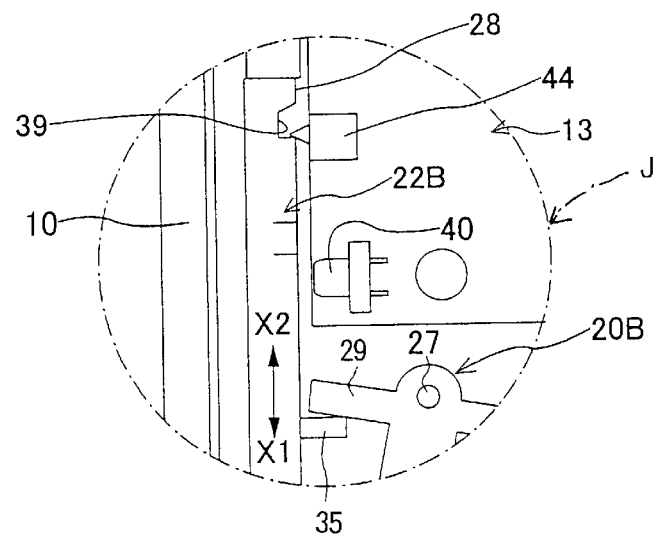
FIG. 21B is an enlarged view of a part of the disk unit indicated by arrow J in FIG. 21A.

FIG. 21A shows an emergency state of the disk unit 1C. This emergency state is a state where a normal lock release operation cannot release the lock on the tray 2, for instance, in the case of ejecting the tray 2 when the solenoid 21 is not drivable (in a failed state) or energized (in a power-off state).

In order to eject the tray 2 from the chassis 10 when the disk unit 1C enters the emergency state, as shown in FIG. 21A, a jig 45 is employed to move the operation and light-emitting part 30 deeper in the X2 direction than in a normal eject operation.

As previously described, the eject rod 22B has the emergency convex part 35 formed thereon, and the lock arm 20B includes the lock release arm 29. When the eject rod 22B is moved up to a predetermined position in the X2 direction (a position shown in FIGS. 21A and 21B), the emergency convex part 35 and the lock release arm 29 engage each other so as to turn the lock arm 20 on the spindle 27 in the clockwise direction of the drawings.

Thus, the recording medium loading device of this embodiment employs the eject rod 22B also as an emergency rod. This also reduces the number of the components of the recording medium loading device. Further, the emergency hole 121 shown in FIG. 1, which is required in the conventional recording medium loading device, can be dispensed with, thus preventing static electricity from being discharged into the recording medium loading device through the emergency hole 121.

In the above-described embodiments, the disk units 1, 1A, 1B, and 1C are each employed as an electronic device for including a recording medium loading device. However, the present invention is not limitedly applicable to these disk units, but is widely applicable to other disk units such as a magnetic disk unit and a magneto-optical disk unit.

The present invention is not limited to the specifically disclosed embodiments, but variations and modifications may be made without departing from the scope of the present invention.

The present application is based on Japanese priority applications No. 2000-229855 filed on Jul. 28, 2000, No. 2000-229856 filed on Jul. 28, 2000, and No. 2001-172912 filed on Jun. 7, 2001, the entire contents of which are hereby incorporated by reference.

What is claimed is:

1. A recording medium loading device comprising:
   a chassis;
   a movable unit for holding a recording medium, said movable unit being movable between a housed position in which said movable unit is housed in said chassis and an ejected position to which said movable unit is ejected from said chassis;
   a light-emitting part provided in said chassis; and
   a light-displaying member letting light traveling therethrough and provided in said movable unit, said light-displaying member comprising:
      a light-receiving part opposing said light-emitting part to receive light emitted therefrom when said movable unit is in the housed position; and
      a display part displaying the light received by said light-receiving part so that the light is visually recognizable from outside said movable unit.

2. The recording medium loading device as claimed in claim 1, further comprising a lock unit,
   said lock unit comprising a lock member movable between a locking position to lock said movable unit in the housed position and an unlocking position to unlock said movable unit,
   wherein said light-displaying member is movable between first and second positions, said light-displaying member applying force to said lock member so as to move said lock member from the locking position to the unlocking position by moving from the first position to the second position.

3. A recording medium loading device comprising:
   a chassis;
   a movable unit for holding a recording medium, said movable unit being movable between a housed position in which said movable unit is housed in said chassis and an ejected position to which said movable unit is ejected from said chassis;
   an operation member movable with respect to said movable unit and manually operated to move from a first position to a second position;
   a detection part provided in said chassis and detecting at least a movement of said operation member from the first position to the second position by detecting said operation member; and
   a lock release part releasing a lock set on said movable unit by said lock unit based on a detection result provided by said detection part.

4. The recording medium loading device as claimed in claim 3, wherein said detection part comprises a single detection switch that detects at least a first state in which said operation member is in the first position and a second state in which said operation member is in the second position.

5. The recording medium loading device as claimed in claim 3, wherein said detection part comprises:
   a detected part formed in said operation member;
   a single detection switch generating a detection signal by detecting said detected part; and
   a position detection part detecting a position of said operation member based on an output change of said detection signal.

6. The recording medium loading device as claimed in claim 3, wherein:
   said operation member is movable to a third position; and
   said lock unit is actuated directly by moving said operation member to the third position so as to release the lock set on said movable unit by said lock unit.

* * * * *